United States Patent

Mukaiyama et al.

Patent Number: 6,019,470
Date of Patent: Feb. 1, 2000

[54] PROGRESSIVE MULTIFOCAL LENS AND MANUFACTURING METHOD OF EYEGLASS LENS AND PROGRESSIVE MULTIFOCAL LENS

[75] Inventors: Hiroyuki Mukaiyama; Kazutoshi Kato, both of Suwa, Japan

[73] Assignee: Seiko Epson Corporation, Tokyo, Japan

[21] Appl. No.: 08/849,386

[22] PCT Filed: Oct. 11, 1996

[86] PCT No.: PCT/JP96/02973

§ 371 Date: Jun. 3, 1997

§ 102(e) Date: Jun. 3, 1997

[87] PCT Pub. No.: WO97/19382

PCT Pub. Date: May 29, 1997

[30] Foreign Application Priority Data

Nov. 24, 1995 [JP] Japan ................................. 7-306189

[51] Int. Cl.[7] .................................................... G02C 7/06
[52] U.S. Cl. ........................................... 351/169; 351/177
[58] Field of Search .................................. 351/168, 169, 351/170, 171, 172, 177

[56] References Cited

U.S. PATENT DOCUMENTS

| | | |
|---|---|---|
| 4,606,622 | 8/1986 | Fueter et al. ............................. 351/169 |
| 4,950,057 | 8/1990 | Shirayanagi ............................. 351/169 |
| 5,137,343 | 8/1992 | Kelch et al. ............................. 351/169 |

FOREIGN PATENT DOCUMENTS

| | | |
|---|---|---|
| 0-101-972-A2 | 3/1984 | European Pat. Off. . |
| 33-31-757-A1 | 5/1985 | Germany . |
| 57-158829 | 9/1982 | Japan . |
| 2-289818 | 11/1990 | Japan . |
| 6-118353 | 4/1994 | Japan . |

*Primary Examiner*—Scott J. Sugarman
*Attorney, Agent, or Firm*—Oliff & Berridge, PLC

[57] ABSTRACT

A progressive multifocal lens used for correction of vision includes a progressive refractive surface positioned closest to the user's eye when the lens is worn by the user, and a second surface on an object side of the lens. Because the base curve of the second surface can be a constant spherical surface, it is possible to prevent variations in magnification due to shape factors. In addition, differences in magnification between a distance-vision region and a near-vision region of the progressive multifocal lens are reduced, and variations in the magnification of a progressive refractive region in the progressive multifocal lens can be suppressed. Accordingly, image jumping and warping due to differences in magnification are reduced, resulting in a comfortable visual field for the user. A progressive multifocal lens for correction of astigmatism includes a progressive refractive surface and a toric surface that are combined to form a composite surface positioned closest to the user's eye when the lens is worn by the user.

20 Claims, 22 Drawing Sheets

| | CONCAVE PROGRESSION (PRESENT INVENTION) | CONVEX PROGRESSION (CONVENTIONAL) |
|---|---|---|
| MAGNIFICATION FOR DISTANCE VISION | 1.047 | 1.047 |
| MAGNIFICATION FOR NEAR VISION | 1.097 | 1.108 |
| DIFFERENCE OF MAGNIFICATION BETWEEN FAR AND NEAR | 0.050 | 0.061 |

| JOIN DEGREE (D) | CONCAVE PROGRESSION (PRESENT INVENTION) | CONVEX PROGRESSION (CONVENTIONAL) |
|---|---|---|
| 0.50 | 0.008 | 0.009 |
| 0.75 | 0.011 | 0.013 |
| 1.00 | 0.015 | 0.018 |
| 1.25 | 0.019 | 0.022 |
| 1.50 | 0.023 | 0.027 |
| 1.75 | 0.027 | 0.032 |
| 2.00 | 0.031 | 0.036 |
| 2.25 | 0.035 | 0.041 |
| 2.50 | 0.039 | 0.046 |
| 2.75 | 0.043 | 0.051 |
| 3.00 | 0.048 | 0.055 |
| 3.25 | 0.052 | 0.060 |
| 3.50 | 0.056 | 0.065 |

FIG.3

Z COORDINATES (mm)

Z COORDINATES (mm)

| | CONCAVE PROGRESSION (PRESENT INVENTION) | | CONVEX PROGRESSION (CONVENTIONAL) | |
|---|---|---|---|---|
| | 90° DIRECTION | 180° DIRECTION | 90° DIRECTION | 180° DIRECTION |
| MAGNIFICATION FOR DISTANCE VISION | 0.976 | 0.947 | 0.976 | 0.947 |
| MAGNIFICATION FOR NEAR VISION | 1.007 | 0.976 | 1.011 | 0.980 |
| DIFFERENCE OF MAGNIFICATION BETWEEN FAR AND NEAR | 0.031 | 0.029 | 0.035 | 0.033 |

Z COORDINATES (mm)

Z COORDINATES (mm)

Z COORDINATES (mm)

PROGRESSIVE MULTIFOCAL LENS AND MANUFACTURING METHOD OF EYEGLASS LENS AND PROGRESSIVE MULTIFOCAL LENS

FIELD OF THE INVENTION

The present invention relates to a progressive multifocal lens for correction of vision, and a manufacturing method of an eyeglass lens and a progressive multifocal lens using it.

DESCRIPTION OF RELATED ART

A progressive multifocal lens is a lens comprising two field sections having different refractive power, and a field section whereby the refractive power changes progressively between these. It is superior in external appearance, as there are no boundaries in these field sections. Furthermore, fields having different refractive powers in a single lens can be obtained. Therefore, it is used widely as an eyeglass lens having vision correcting functions for aging vision and the like.

FIGS. 25(a) and 25(b) shows the general structure of a conventional progressive multifocal lens used widely as an eyeglass lens. This progressive multifocal lens 1 is provided on the upper side with a distance-vision region 11 being a field section for seeing objects at a far distance. A field section for seeing objects at a near distance having a different refractive power from the distance-vision region 11 is provided on the lower side as a near-vision region 12. Also, the distance-vision region 11 and near-vision region 12 are joined smoothly by a progressive region 13 being a field section having a refractive power that changes continuously for seeing objects at an intermediate distance between the far distance and the near distance.

In a single lens 1 used for an eyeglass, all the capabilities required for an eyeglass, for example, a vertex power matching the user's prescription, a cylinder power for correcting astigmatism, a join power for correcting aging vision, and furthermore a prism power for correcting skew, must be provided by the two surfaces being a refractive surface 2 on the side of the eye and a refractive surface 3 on the side of the observed object. Therefore, in a conventional progressive multifocal lens 1, as shown in FIG. 25, a progressive refractive surface 5 providing a refractive power that changes continuously in order to compose the distance-vision region 11, near-vision region 12, and progressive region 13, is formed on the refractive surface 3 on the side of the object. The refractive surface 2 is used as a refractive surface, or the like, for correcting astigmatism as described above.

FIG. 26 shows the astigmatism obtained with the conventional progressive multifocal lens 1, and FIG. 27 shows the summary distribution of the z coordinates of the progressive refractive surface 5 formed on the refractive surface 3 of the conventional progressive multifocal lens on the side of the object. On the refractive surface 3, the plane surface is represented as the xy coordinates, and the direction showing the thickness of the lens perpendicular to this xy plane is represented as the z coordinates. There is no particular need to define the direction of the x and y coordinates, however, in the following explanation the up-and-down direction when the lens 1 is worn as an eyeglass lens is the y coordinate, and the left-right direction is the x coordinate.

Because the progressive refractive face 5 is non-spherical so as to change continuously the refractive power, the curvature changes according to each region of the surface. Consequently, as understood from FIG. 26, even in a progressive multifocal lens 1 not for correction of astigmatism having the surface 2 on the side of the eye as a spherical surface, if a progressive refractive surface 5 is introduced on the surface 3 on the side of the object, an astigmatic aberration is generated on the surface by the difference in curvature in the x direction and the y direction. This astigmatic aberration is represented in diopter (D) units, and the drawing of astigmatic aberration shown in FIG. 26 is a drawing having the regions of specific diopters connected by contour lines.

A user of an eyeglass not having astigmatism can obtain clear vision without perceiving so much the fading of an image if the astigmatic aberration appearing in the lens is 1.0 diopters or less, preferably 0.5 diopters or less. Therefore, a clear vision region 21 having an astigmatic aberration of 1.0 diopters or less, or preferably 0.5 diopters or less, is placed extending from the distance-vision region to the near-vision region following the main line of sight (umbilical meridian) 14 somewhat bent on the side of the nose, crowding the vision. On this main line of sight 14, in particular, an astigmatic aberration is not generated by substantially eliminating the difference in curvature in the x direction and in the y direction. Consequently, the astigmatic aberration appears greater because the lens 1 becomes non-spherical in the direction of the perimeter from the main line of sight 14.

Furthermore, if such an astigmatic aberration changes greatly, it becomes a cause of discomfort as the image jumps following the line of sight when the user moves the line of sight. Therefore, in the distance-vision region 11 having great movement of the line of sight, it is set such that the astigmatic aberration does not change so much. Also, design of a progressive refractive surface 5 is made such that the astigmatic aberration does not change greatly in the other regions as well. Also, an eyeglass lens 9 is formed by globe processing the lens 1 into a shape matching the eyeglass frame, and is provided to the user.

The lens 1 shown in FIG. 26 and FIG. 27 is a lens whereby the base curve Pb, showing the fundamental refractive power of the surface 3 on the side of the object having the progressive refractive surface 5 applied, is 4.00 D, the join degree Pa is 2.00 D, the surface refractive power D2 of the surface 2 on the side of the eye is 6.00 D, the center thickness t of the lens is 3.0 mm, and the diameter d of the lens is 70.0 mm.

FIGS. 28(a) and 28(b) shows a conventional progressive multifocal lens 1 for astigmatism whereby a toric surface 6 having a cylinder power C for correcting astigmatism is formed on the surface 2 on the side of the eye. Also, FIG. 29 shows a drawing of the astigmatic aberration of this lens. FIG. 30 shows the z coordinates of the toric surface 6. The lens showing astigmatic aberration in FIG. 29 has a cylinder power C of −2.00 D. The other conditions are identical to the lens showing astigmatic aberration in FIG. 26. This progressive multifocal lens 1 for astigmatism has an astigmatic aberration of 2.00 D introduced substantially uniformly in order to correct the astigmatism following the main line of sight 14. An eyeglass lens 9 can be formed by globe processing according to the eyeglass frame identically to that mentioned above.

Thus, an eyeglass lens is sold on the market that corrects astigmatism, whereby the refractive power changes continuously from the distance-vision region to the near-vision region using a progressive refractive surface, and it is used widely as a means to correct vision. If the progressive multifocal lens has a high prescription to become a measure for correction of vision, and if the join degree, being the difference in refractive power between the distance-vision region and the near-vision region, is great, the astigmatic aberration appearing in the lens also becomes great because the progressive refractive surface is made further non-spherical.

Therefore, it is possible to provide the user with a comfortable visual field by improving the shape of the progressive refractive surface, and removing the astigmatic aberration from the commonly used regions of the lens, preventing a dramatic change in astigmatic aberration. Jumping and warping of images can be improved by suppressing the variation of astigmatic aberration. However, in a progressive multifocal lens, jumping and warping of images are also caused by differences in refractive power between the distance-vision region and the near-vision region. That is, the distance-vision region 11 has a refractive power whereby the focus meets at a distance, while the near-vision region 12 has a refractive power different from that of the distance-vision region 11 whereby the focus meets nearly. Consequently, in the progressive region 13, because the magnification gradually varies, this is one main reason why the acquired images jump and are distorted.

In the design of a progressive refractive surface, all kinds of proposals already have been tried. Also, designs using the computational powers of computers have been tried as well. The suppression of jumping and warping of images by improving the astigmatic aberration of the progressive refractive surface is considered to have nearly reached its limit. Thus, in the present invention, the aim is to provide a progressive multifocal lens capable of improving the jumping and warping of images caused by variation of the magnification between the distance-vision region and the near-vision region of the progressive multifocal lens.

Also, the aim is to provide a progressive multifocal lens and eyeglass lens that can reduce more greatly the jumping and warping of images while approaching the limits in the design of the progressive refractive surface, and that can provide a more comfortable visual field to the user. Also, the aim is to provide a progressive multifocal lens and eyeglass lens that can provide clear vision having little jumping and warping even for users having a great difference in prescription (join degree) between the distance-vision region and the near-vision region, which easily generates jumping and warping of images.

SUMMARY OF THE INVENTION

Therefore, the inventors of the present invention have focused on the placement of the progressive refractive surface contributing to magnification of a progressive multifocal lens, and have discovered that it is possible to reduce the difference of magnification between the distance-vision region and the near-vision region by introducing the progressive refractive surface on the side of the eye. That is, the present invention is a progressive multifocal lens for correction of vision, comprising a distance-vision region and a near-vision region having different refractive power, and a progressive region whereby the refractive power between these changes progressively, wherein a curvature of the progressive surface for composing the distance-vision region, near-vision region, and progressive region are provided on the surface of the progressive multifocal lens on the side of the eye.

The lens magnification SM generally is represented by the following equation.

$$SM = Mp \times Ms \quad (1)$$

Here, Mp is the power factor. Also, Ms is called the shape factor. As shown in FIG. 1, the distance from the vertex (internal vertex) of the surface of the lens on the side of the eye to the eye is represented below as L, the refractive power of the internal vertex (internal vertex power) as Po, the center thickness of the lens as t, the refractivity of the lens as n, the base curve (refractive power) of the surface of the lens on the side of the object as Pb.

$$Mp = 1/(1 - L \times Po) \quad (2)$$

$$Ms = 1/(1 - (t \times Pb)/n) \quad (3)$$

In the computations of Equations (2) and (3), diopters (D) is used regarding the internal vertex power Po and the base curve Pb, and meters (m) is used regarding the distance L and thickness t.

The internal vertex power Po contributes to the correction of vision in the distance-vision region and the near-vision region, and it is understood that, if it is a lens for which an equal internal vertex power Po can be achieved, the variation of the magnification SM can be controlled by suppressing the variation of the base curve Pb of the surface on the side on the eye. For example, if the base curve Pb of the concave surface on the side of the object is made constant, the variation of the magnification SM due to the shape factor Ms can be eliminated.

Nevertheless, as shown by the broken line in FIG. 1, when the progressive refractive surface is provided on the surface on the side of the object, the base curve Pb on the side of the object cannot be made constant. Furthermore, the variation of the shape factor Ms becomes greater as the join degree becomes greater. Jumping and warping of images increases. Thus, in the present invention, it is made possible to suppress the variation of the base curve Pb of the surface on the side of the object, as shown by the solid line in FIG. 1, by introducing the progressive refractive surface into the concave surface on the side of the eye, and to provide a spherical progressive multifocal lens having, for example, a constant base curve.

Consequently, in the progressive multifocal lens of the present invention, the difference in magnification between the distance-vision region and the near-vision region can be held to a necessary minimum. Also, because the variation of the magnification in the progressive region can be suppressed as well, even if the performance according to the distortion of images is the same extent as a conventional progressive multifocal lens, a progressive multifocal lens and eyeglass lens can be provided whereby the jumping and warping of images is reduced, and a more comfortable visual field can be provided to the user. Particularly, in a progressive multifocal lens having a great join degree, the jumping and warping can be reduced.

FIG. 2 compares the magnification achieved by a progressive multifocal lens of the present invention having a base curve Pb of 5.00 D, a join degree of 3.00 D, a spherical power S of 2.00 D, a refractivity n of 1.662, and a distance L of 15.0 mm as an example, and the magnification achieved by a conventional progressive multifocal lens having the progressive refractive surface on the side of the object. As is clear from this drawing, in the progressive multifocal lens of the present invention, the difference in magnification between the distance-vision region and the near-vision region can be suppressed to 80% of the conventional difference of magnification. Jumping and warping of images are prevented to a great degree.

Furthermore, as shown in FIG. 3, this effect becomes prominent as the join degree Pa becomes greater. FIG. 3 shows, as an example, the difference of magnification between the distance-vision region and the near-vision region of a progressive multifocal lens pertaining to the present invention having a progressive refractive surface on the surface (concave surface) on the side of the eye, whereby the base curve Pd for the above-mentioned lens is 4.00 D, and the spherical power S is 0.00 D. Also, to be compared with this, the difference of magnification between the distance-vision region and the near-vision region of a conventional progressive multifocal lens having the progressive refractive surface on the surface (convex surface) on the side of the object is shown.

As is clear from this drawing, in the progressive multifocal lens of the present invention, it is possible to use the same extent of difference of magnification as that of a conventional progressive multifocal lens having a join degree Pa from under rank 1 (the difference of Pa is as much as 0.25 D) to under rank 2 at high join degree. As a result, the jumping and warping of images acquired by the user also can be suppressed to the same extent as a conventional rank 1 or rank 2 join degree lens.

In the progressive multifocal lens of the present invention, because the curvature of the progressive refractive surface is provided to the surface on the side of the eye, the curvature of the progressive refractive surface (reciprocal of the radius of curvature) following the main line of sight becomes smaller in the near-vision region compared with the distance-vision region. Also, in the distance-vision region, the curvature of the progressive refractive surface becomes smaller in at least one region as it departs from the main line of sight. Also, in the near-vision region, the curvature of the progressive refractive surface becomes greater in at least on region as it departs from the main line of sight.

Also, it is possible to make a progressive multifocal lens having a join degree in the range of 0.5–3.5 to correspond to a wide range of users, from users having almost no advance of aging vision to users having advanced aging vision where the power to accommodate is almost entirely lost. Also, as shown in FIG. 3, it is clear that a great effect can be achieved in the improvement of jumping and warping of images in a progressive multifocal lens of the present invention within this range.

When the surface of the progressive multifocal lens of the present invention is a rotation symmetric surface, this range of join degree is expressed as follows using the average surface refractive power D1 on the side of the eye in the vicinity of the main line of sight of the -distance-vision region, and the average surface refractive power D2 on the side of the eye in the vicinity of the main line of sight of the near-vision region.

$$0.5 \leq (D1-D2) \leq 3.5 \tag{4}$$

Furthermore, as a progressive refractive surface, it is desirable to minimize the astigmatic aberration when forming the progressive refractive surface on the main line of sight. Therefore, it is desirable that the curvature of the progressive refractive surface have the curvature of two orthogonal directions be equal in at least one region of the main line of sight.

In the progressive multifocal lens of the present invention, because the progressive refractive surface is provided on the surface on the side of the eye, a progressive multifocal lens for correction of astigmatism whereby the surface on the side of the eye has the astigmatism correcting properties can be provided by applying the curvature of an astigmatism correcting toric surface to the surface on the side of the eye. That is, the surface on the side of the eye is the progressive refractive surface. Furthermore, a progressive multifocal lens having cylinder power can be provided.

Also, by using as an eyeglass lens the progressive multifocal lens having astigmatism correcting properties of the present invention, the difference of magnification between the distance-vision region and the near-vision region can be held to a minimum as described above, and a more comfortable visual field can also be provided to a user having astigmatism, there being little warping and jumping of images in addition to being able to correct astigmatism.

A progressive multifocal lens having vision correcting properties and astigmatism correcting properties applied to the surface on the side of the eye can be manufactured by a manufacturing method comprising a first process that determines a progressive refractive surface (henceforth, original progressive refractive surface) only for the purpose that the surface on the side of the eye demonstrates the desired vision correcting properties, a second process that determines a toric surface (henceforth, original toric surface) only for the purpose that the surface on the side of the eye demonstrates the intended astigmatism correcting properties, and a third process that determines the surface of the progressive multifocal lens on the side of eye from the original progressive refractive surface and the original toric surface. By introducing to the surface on the side of the eye a progressive refractive surface whereby the original progressive refractive surface and the original toric surface are composed, a progressive multifocal lens can be realized, having both an astigmatism correcting function using the toric surface and a vision correcting function for correction other than astigmatism using the progressive refractive surface, and furthermore, having little jumping and warping.

In the third process described above, it is possible to compose a progressive refractive surface having astigmatism correcting properties by adding the z coordinates composing the original progressive refractive surface having the vision correcting properties to the values of the z coordinates for composing the original toric surface having the astigmatism correcting properties. Nevertheless, according to the results of examination by the present inventors, in order to achieve an astigmatism correcting function (astigmatic aberration property) being equal to that of a conventional progressive multifocal lens for correction of astigmatism whereby the side of the object is the progressive refractive surface and the side of the eye is the toric surface, it is desirable that the progressive refractive surface be composed using a composite equation such as shown in the following Equation (5).

That is, in the third process, by seeking the value at any point p (X, Y, Z) of the surface of the progressive multifocal lens on the side of the eye by the following Equation (5) using the approximate curvature Cp of the original progressive refractive surface, the curvature Cx of the original toric surface in the x direction, and the curvature Cy in the y direction, a progressive multifocal lens for correction of astigmatism can be provided having an astigmatism correcting capability and a vision correcting function equal to the conventional progressive multifocal lens and, furthermore, having a small difference in magnification and improved jumping and warping.

$$Z = \frac{(Cp + Cx) X^2 + (Cp + Cy) Y^2}{1 + \sqrt{(1 - (Cp + Cx)^2 X^2 - (Cp + Cy)^2 Y^2)}} \tag{5}$$

Here, while the eyeglass is being worn, when the axis passing through the center of the progressive refractive surface from the side of the object to the side of the eye is taken as the z axis, the axis orthogonal to the z axis oriented from below to above is taken as the y axis, and the axis orthogonal to the z axis oriented from left to right is taken as the x axis. X and Y indicate arbitrary points on the x and y coordinates, respectively, on the surface on the side of the eye, and Z indicates the z coordinate in the perpendicular direction of the surface on the side of the eye. Also, curvature Cp is the approximate curvature at any point p (X, Y, Z) of the original progressive refractive surface, curvature Cx is the curvature in the x direction of the toric surface for correction of astigmatism, and curvature Cy is the curvature in the y direction.

In the present example, the average curvature of the radial direction is used as the approximate curvature Cp, and the reciprocals of the circular radius passing through the three points in the xy plane perpendicular to the z axis (passing through the center of the lens or the internal vertex (0, 0, 0)), including any point p (X, Y, Z) on the original progressive refractive surface, the point p' (−X, −Y, Z) rotationally symmetric with point p, and the internal vertex (0, 0, 0) are used. However, when the point p on the original progressive refractive surface is positioned at the internal vertex, the average curvature in the radial direction Cp is not defined, and Z=0 in Equation (5).

In the present invention, by using such a Composite Equation (5), it is possible to apply the properties of the original progressive refractive surface and the original toric surface. Consequently, a progressive multifocal lens for correction of vision on the side of the eye, and furthermore, a progressive multifocal lens comprising a progressive refractive surface on the side of the eye, having both vision correcting and astigmatism correcting properties, can be provided, and an eyeglass lens for a wide range of users covering a range from users not having astigmatism to users requiring correction of astigmatism can be realized. Therefore, it becomes possible to provide to the market eyeglass lenses having little jumping and warping using a series of progressive multifocal lenses for all users.

Also, by applying a 270° base prism on a progressive multifocal lens having a progressive refractive surface on the side of the eye, the progressive multifocal lens can be made lightweight. Also, by setting the vertex power Ps of the distance-vision region, the join power (join degree) Pa, and the refractive power (base curve) of the surface of the progressive multifocal lens on the side of the object such that they satisfy the following equation, a progressive multifocal lens of the present invention can be provided, having a progressive refractive surface on the side of the eye as a meniscus applied to an eyeglass lens.

$$Pb > Ps + Pa \qquad (6)$$

BRIEF DESCRIPTION OF THE DRAWINGS

FIG. 3 is a drawing showing the difference in magnification between the distance-vision region and the near-vision region for each join degree of a progressive multifocal lens of the present invention as an example, compared with a conventional progressive multifocal lens.

DETAILED DESCRIPTION OF PREFERRED EMBODIMENTS

The present invention is explained in further detail below based on several progressive multifocal lenses designed based on the present invention.

Embodiment 1

Figures 1, 2:
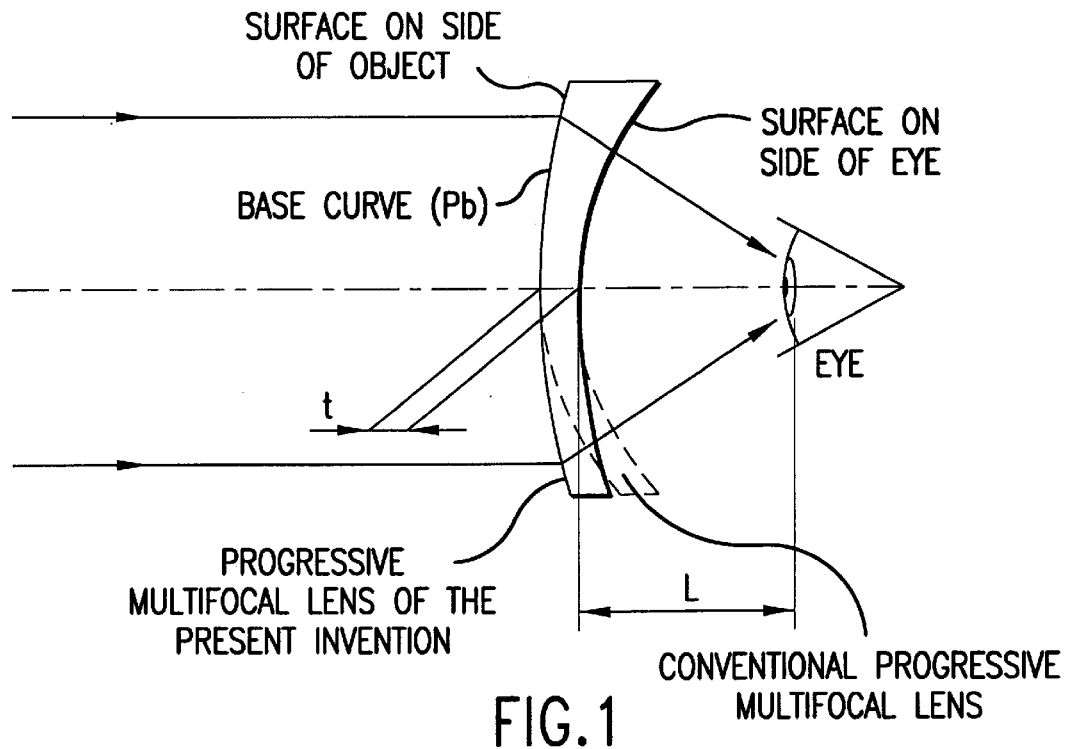
FIG. 1 is an explanatory drawing showing an overview of a progressive multifocal lens of the present invention.
FIG. 2 is a drawing showing the magnification of the distance-vision region, the magnification of the near-vision region, and the difference in magnification between the distance-vision region and the near-vision region of a progressive multifocal lens of the present invention as an example, compared with a conventional progressive multifocal lens.
Figure 4A:
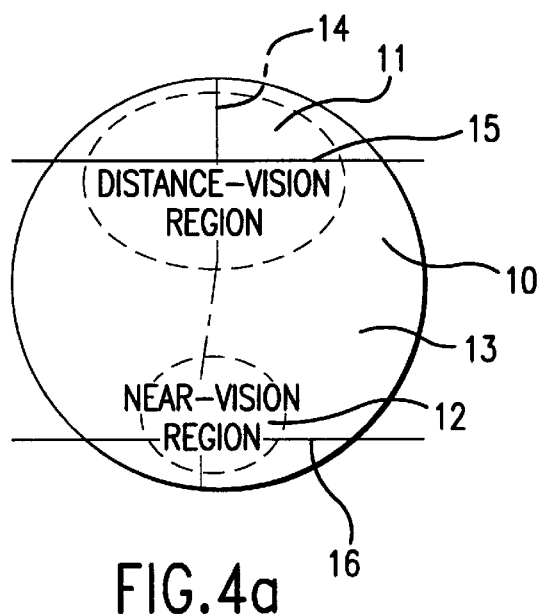
FIG. 4(a) is a front view of a first embodiment of the progressive multifocal lens of this invention.
Figure 4B:
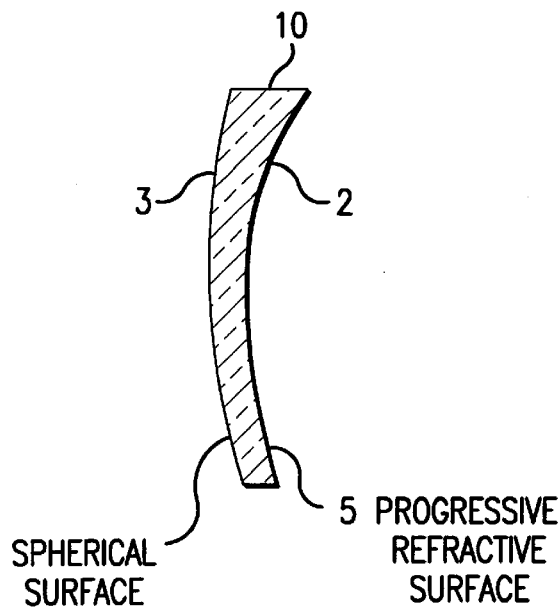
FIG. 4(b) is a sectional view of the progressive multifocal lens of FIG. 4(a) along a main line of sight.
Figure 25A:
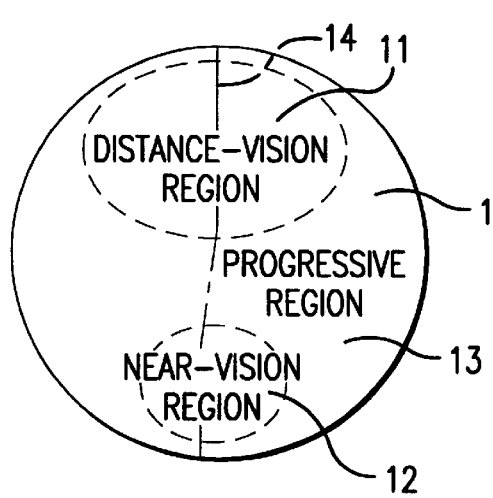
FIG. 25(a) is a front view of a conventional progressive multifocal lens.
Figure 25B:
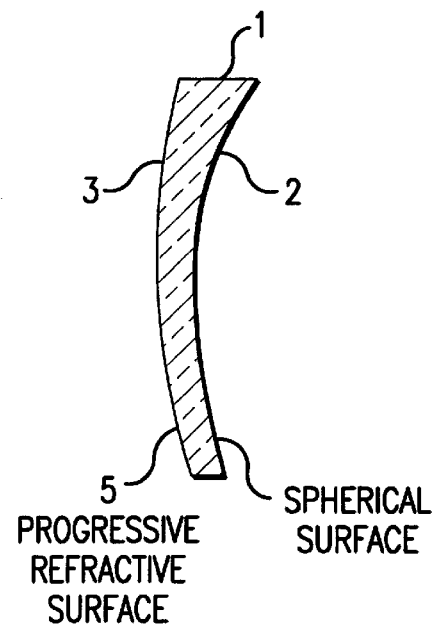
FIG. 25(b) is a sectional view of the conventional progressive multifocal lens of FIG. 25(a) along a main line of sight.

FIGS. 4(a) and 4(b) show a progressive multifocal lens 10 of the present invention having a progressive refractive surface 5 on the surface 2 on the side of the eye. In the same manner as the conventional progressive multifocal lens shown in FIG. 25(a) and 25(b), the progressive multifocal lens 10 of the present embodiment is provided with a distance-vision region 11 on the upper side, being a vision section for seeing objects at far distances, and a vision section for seeing objects at close distances having a refractive power different from the distance-vision region 11 is provided on the lower side as a near-vision region 12. Furthermore, the distance-vision region 11 and the near-vision region 12 are joined smoothly by a progressive region 13 whereby the refractive power varies continuously.

The progressive multifocal lens 10 of the present embodiment has a non-spherical progressive refractive surface 5 on the surface 2 on the side of the eye to form the distance-vision region 11, the near-vision region 12, and the progressive region 13. Therefore, the surface 3 on the side of the object can be formed spherically whereby the base curve Pd becomes constant. Consequently, as explained using Equations (1)–(3) above, the difference in magnification between the distance-vision region 11 and the near-vision region 12 becomes smaller, and the rate by which the magnification changes in the progressive region 13 can be made smaller. Consequently, compared with a conventional progressive multifocal lens having a progressive refractive surface on the side of the object, the jumping and distortion of images caused by the difference in magnification can be reduced to a great extent.

Figure 5:
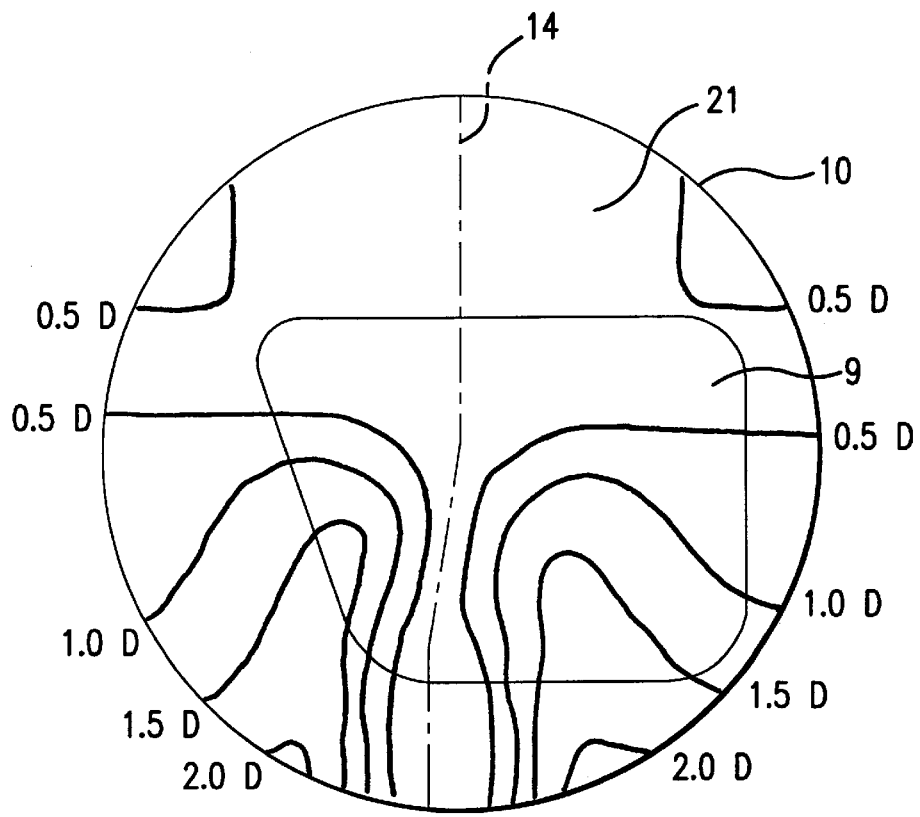
FIG. 5 is a drawing showing the astigmatic aberration of the progressive multifocal lens shown in FIGS. 4(a) and 4(b).
Figure 6:
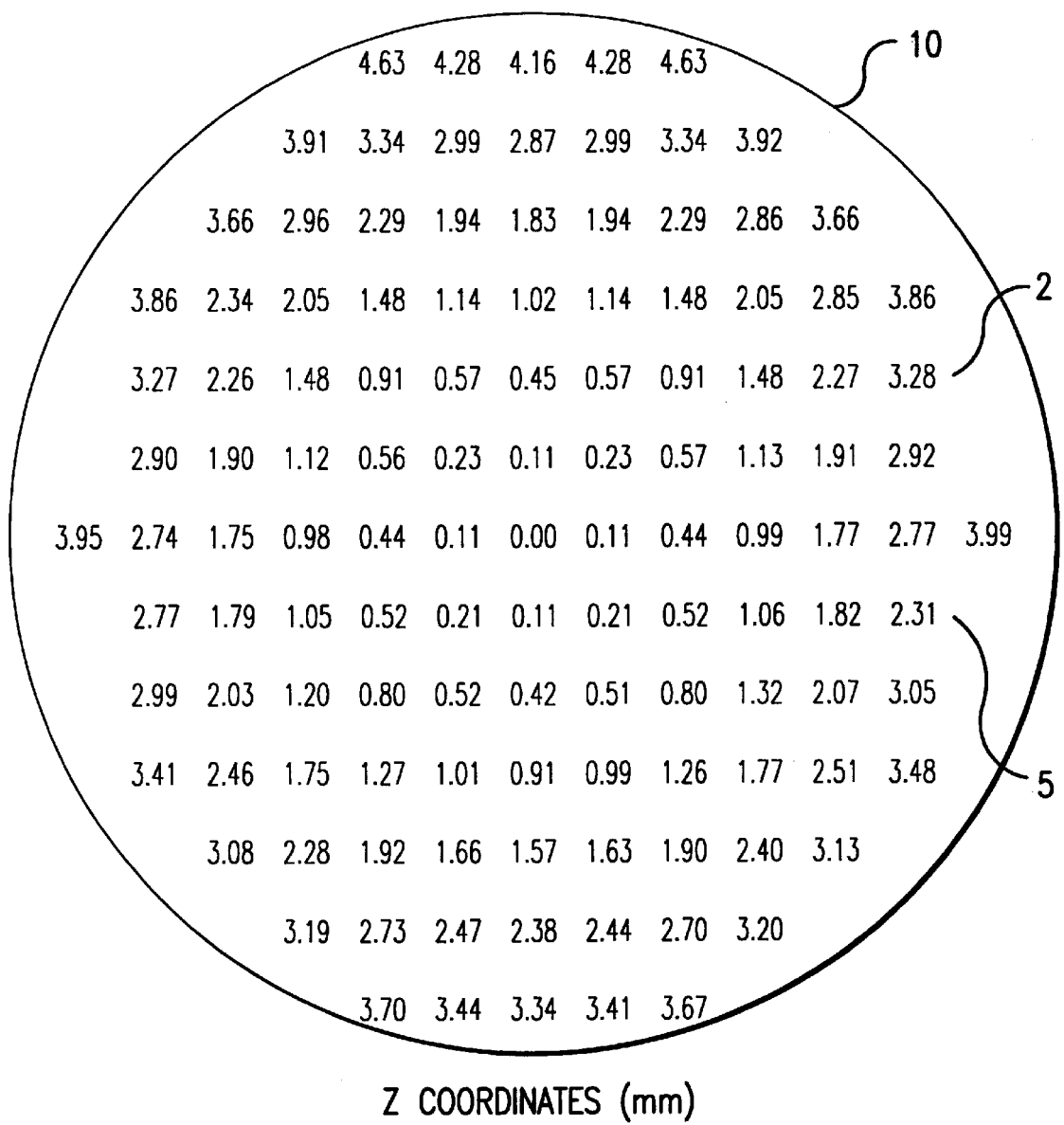
FIG. 6 is a drawing showing the z coordinates of the surface on the side of the eye of the progressive multifocal lens shown in FIGS. 4(a) and 4(b).

FIG. 5 and FIG. 6 show the astigmatic aberration of a progressive multifocal lens 10 of the present invention having a progressive refractive surface on the surface 2 on the side of the eye, and the z coordinates of the surface 2 on the side of the eye, that is, the progressive refractive surface 5. The progressive multifocal lens 10 of the present embodiment is designed such that the same degree of astigmatic aberration can be obtained as a conventional progressive multifocal lens having the progressive refractive surface on the surface 3 on the side of the object.

The progressive multifocal lens 10 shown in FIG. 5 and FIG. 6 has a spherical surface 3 on the side of the object, and the base curve Pb indicating its refractive power is a constant at 4.00 D. Regarding the surface 2 on the side of the eye, the average surface refractive power of the distance-vision region 11 is set to 6.00 D, the average surface refractive power of the near-vision region 12 to 4.00 D, the join degree Pa to 2.00 D. Also, the sphere power S of the distance-vision region is −2.00 D, the center thickness of the lens is 3.0 mm, and the lens diameter d is 70.0 mm. Under such conditions, a progressive refractive surface 5 such as shown in FIGS. 4(a) and 4(b) can be provided to the surface 2 on the side of the eye. As a result, a progressive multifocal lens 10 can be obtained, having an astigmatic aberration such as shown in FIG. 5.

Figure 26:
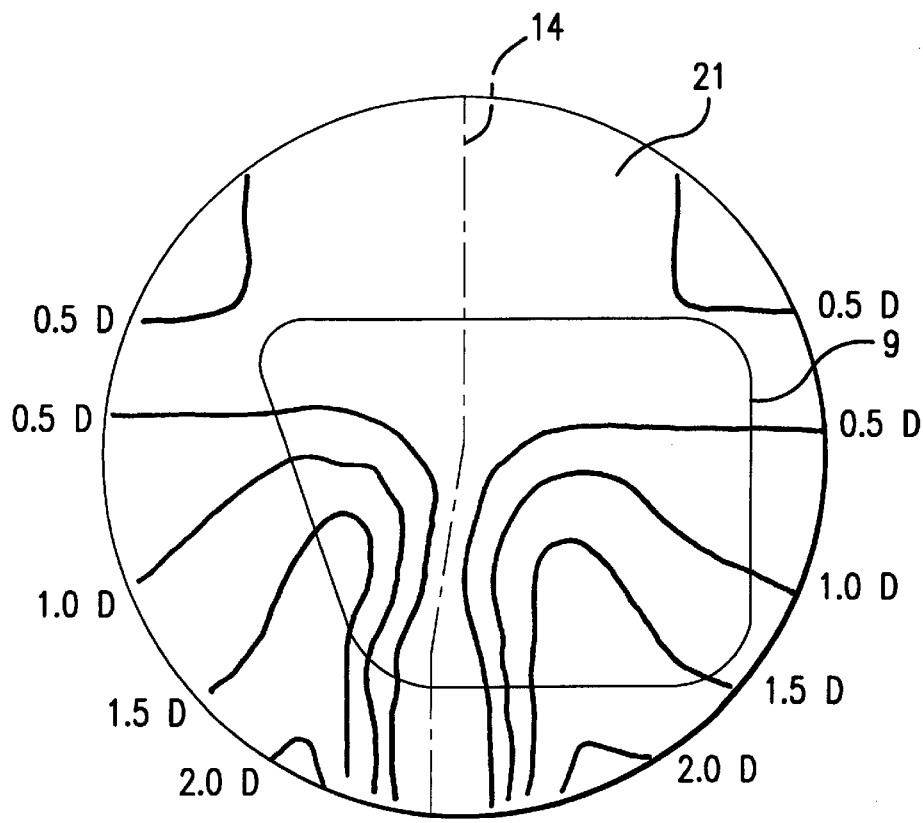
FIG. 26 is a drawing showing the astigmatic aberration of the progressive multifocal lens shown in FIGS. 25(a) and 25(b).
Figure 27:
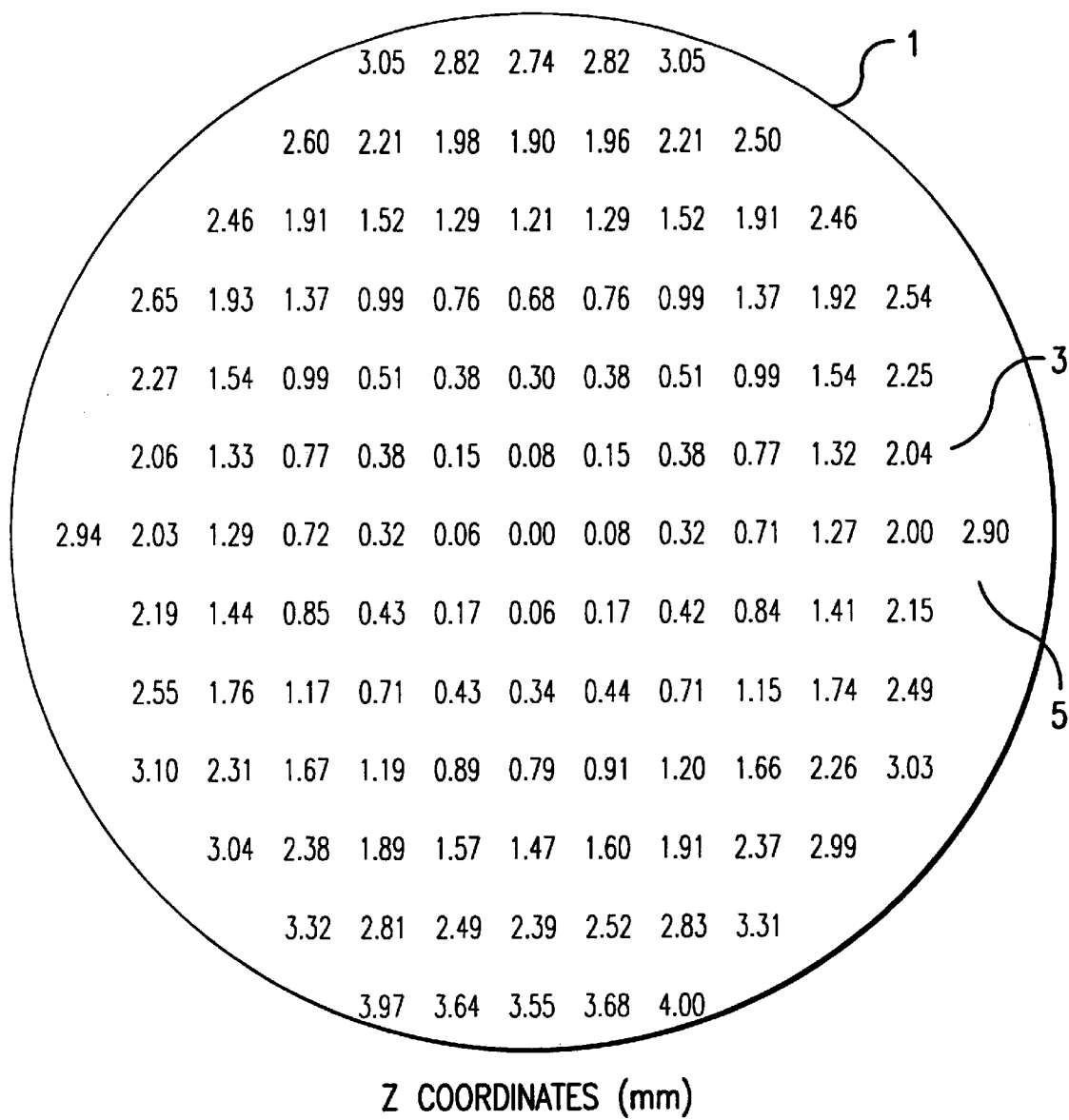
FIG. 27 is a drawing showing the z coordinates of the progressive refractive surface on the side of the object of the progressive multifocal lens shown in FIGS. 25(a) and 25(b).

The astigmatic aberration of the progressive multifocal lens 10 of the present embodiment shown in FIG. 5 is substantially the same as the astigmatic aberration of the conventional progressive multifocal lens shown in FIG. 26. Regarding the astigmatic aberration, it is clear that a progressive multifocal lens 10 can be realized, having the identical performance as a conventional progressive multi-focal lens having the progressive refractive surface provided on the surface 3 on the side of the object, even when the progressive refractive surface 5 is provided on the surface 2 on the side of the eye.

Consequently, regarding the astigmatic aberration, the progressive multifocal lens 10 of the present embodiment is a progressive multifocal lens having the identical properties as conventionally, whereby a clear vision region is secured sufficiently, and having little distortion and jumping of images caused by variation of the astigmatic aberration. Furthermore, in the progressive multifocal lens 10 of the present embodiment, when comparing the difference of magnification between the distance-vision region 11 and the near-vision region 12, the magnification of the distance-vision region is 0.976, the magnification of the near-vision region is 1.007, and their difference is 0.031.

As opposed to this, in the conventional lens 1 having the progressive refractive surface provided on the side of the object, the magnification of the distance-vision region is 0.976, the magnification of the near-vision region is 1.011, and their difference is 0.035. Consequently, it is clear that in the progressive multifocal lens 10 of the present embodiment, the difference of magnification between near and far can be improved as much as 12–13% over the conventional.

By this difference in magnification being reduced in this manner, in the progressive multifocal lens 10 of the present embodiment, the jumping and distortion of images caused in a progressive multifocal lens by the difference in magnification can be improved further. Therefore, an eyeglass lens 9 that is clearer, whereby the jumping and distortion are improved greatly, can be provided by globe processing the progressive multifocal lens 10 of the present embodiment to match the eyeglass frame.

Figure 7:
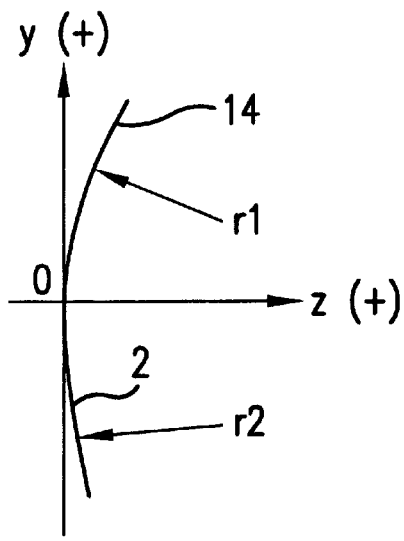
FIG. 7 is a drawing showing the radius of curvature (reciprocal of curvature) of the surface on the side of the eye following the main line of sight of the progressive multifocal lens shown in FIGS. 4(a) and 4(b).

The progressive refractive surface 5 of the present embodiment provided on the surface 2 on the side of the eye is explained further. FIG. 7 shows the variation of the radius of curvature of the progressive refractive surface 5 following the main line of sight 14. The z coordinates of this drawing have the direction of the viewed object set to negative, and the direction of the eye set to positive. In a progressive multifocal lens for an eyeglass, the value of the refractive power of the distance-vision region 11 is smaller than the value of the refractive power of the near-vision region 12, that is, they are set such that it becomes negative when the value of the refractive power of the near-vision region is subtracted from the value of the refractive power of the distance-vision region 11. Therefore, among the radii of curvature of the progressive refractive surface 5 following the main line of sight 14, if the radius of curvature forming the upper distance-vision region 11 is r1, and the radius of curvature forming the near-vision region 12 is r2, the radius of curvature r1 of the progressive multifocal lens 10 of the present embodiment is smaller than the radius of curvature r2. Consequently, if the respective radii of curvature r1 and r2 are represented by the reciprocal curvatures C1 and C2, the curvature C1 of the distance-vision region 11 and the curvature C2 of the near-vision region 12 must satisfy the following relationship.

$$C1 > C2 \tag{7}$$

Figure 8A:
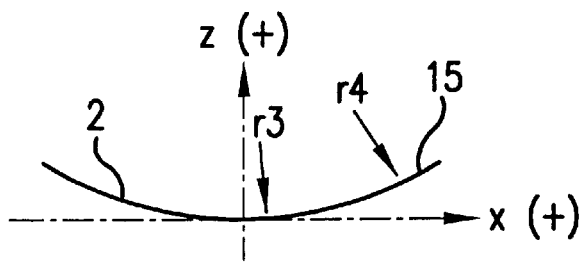
FIG. 8(a) shows the radius of curvature of the surface on the side of the eye for the distance-vision region of the progressive multifocal lens of FIGS. 4(a) and 4(b).
Figure 8B:
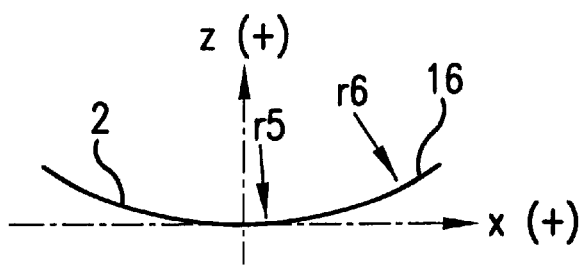
FIG. 8(b) shows the radius of curvature of the surface on the side of the eye for the near-vision region of the progressive multifocal lens of FIGS. 4(a) and 4(b).

Also, as shown in FIG. 8(a), because the radius of curvature of the distance-vision region 11 in the direction orthogonal to the main line of sight 14 forms a progressive region 13 continuously with the near-vision region 12 having a large radius of curvature, a region that becomes larger following movement away from the main line of sight 14 is provided. On the other hand, as shown in FIG. 8(b), because the radius of curvature of the near-vision region 12 in the direction orthogonal to the main line of sight 14 forms a progressive region 13 continuously with the distance-vision region 11 having a small radius of curvature, a region that becomes smaller following movement away from the main line of sight 14 is provided.

That is, in the direction 15 of the distance-vision region 11 orthogonal to the main line of sight 14, if r3 is the radius of curvature in the vicinity of the main line of sight 14, and r4 is the radius of curvature of the region removed from the main line of sight 14 by a range of 5–35 mm, r3 becomes the same as r4 or less. If r3 and r4 are represented by their reciprocal curvatures C3 and C4, in the distance-vision region 11, the curvature C4 of the region removed from the main line of sight 14 in relation to the curvature C3 in the vicinity of the main line of sight 14 satisfies the following relationship.

$$C3 \geq C4 \tag{8}$$

Of course, it is possible to secure a wide clear-vision region in the distance-vision region 11 by making the surface 2 on the side of the eye composing the distance-vision region 11 as a spherical surface, as well as to concentrate the progressive region 13 in the vicinity of the near-vision region 12. In this case, in the distance-vision region 11, the curvature C3 and the curvature C4 become equal.

Meanwhile, in the direction 16 of the near-vision region 12 orthogonal to the main line of sight 14, if r5 is the curvature in the vicinity of the main line of sight 14, and r6 is the curvature of the region removed from the main line of sight 14 by a range of 5–35 mm, r5 becomes the same as r6 or more. Consequently, if r5 and r6 are represented by their reciprocal curvatures C5 and C6, in the near-vision region 12, the curvature C6 of the region removed from the main line of sight 14 in relation to the curvature C5 in the vicinity of the main line of sight 14 satisfies the following relationship.

$$C5 \leq C6 \tag{9}$$

In the near-vision region 12 as well, it is possible to secure a wide clear-vision region by making the surface 2 on the side of the eye composing the near-vision region 12 as a spherical surface, as well as to concentrate the progressive region 13 in the vicinity of the distance-vision region 11. In this case, in the near-vision region 12, the curvature C5 and the curvature C6 become equal.

As for the variation of the radii of curvature of the above-mentioned Equations (8) and (9) oriented laterally in relation to the main line of sight 14, the curvatures in the directions 15 and 16 orthogonal to the main line of sight 14 have been explained as examples. However, there is no strict limitation regarding direction in particular, and it is acceptable as long as the average curvatures satisfy the above-mentioned Equations (8) and (9) as they are distanced from the main line of sight 14.

When the eyeglass lens 9 of the present embodiment is worn by the user, there is much eye movement along the main line of sight 14. Therefore, in a progressive multifocal lens 10 not requiring correction of astigmatism, it is desirable that the main line of sight 14 be composed by an aggregation of the umbilical points in order to prevent jumping and warping of the images. Consequently, the following relationships arise among the various curvatures C1, C2, C3, and C5 described above.

$$C1 = C3$$

$$C2 = C5 \tag{10}$$

At this time, the average surface refractive power D1 of the surface 2 of the distance-vision region 11 on the side of the eye following the main line of sight, and the average surface refractive power D2 of the surface 2 of the near-vision region 12 on the side of the eye are represented by the following equations:

$$D1 = (n-1) \times C1$$

$$D2 = (n-1) \times C2 \tag{11}$$

Here, n is the refractivity of the lens material composing the progressive multifocal lens 10 of the present embodiment.

Because the progressive multifocal lens 10 of the present embodiment has the surface 3 on the side of the object formed as a spherical surface, the join degree Pa can be represented by the difference between the average surface refractive power D1 of the distance-vision region 11 and the average surface refractive power D2 of the near-vision region 12. Furthermore, because the curvature C1 of the distance-vision region 11 is greater than the curvature C2 of the near-vision region 12, as shown in Equation (7), in the surface 2 on the side of the eye, the average surface refractive power D1 of the distance-vision region 11 becomes greater than the average surface refractive power D2 of the near-vision region 12.

As explained above based on FIG. 3, by using the progressive multifocal lens 10 of the present invention, the difference in magnification between the distance-vision region 11 and the near-vision region 12 can be reduced for a wide range of progressive multifocal lenses from a progressive multifocal lens having a join degree of 3.5 diopters for users having substantially no power of accommodation to a progressive multifocal lens having a join degree of 0.5 diopters when aging vision is not substantially advanced, and a comfortable visual field can be provided to the user by suppressing the jumping and warping of images.

For example, even for a user having entirely no power of accommodation, if the join degree is 3.50 diopters, a distance from an infinite distance to approximately 30 cm can be seen clearly. If this range of join degrees is shown using the average surface refractive powers D1 and D2 of the distance-vision region 11 and the near-vision region 12, respectively, it becomes the following Equation (4) as explained above.

$$0.5 \leq (D1-D2) \leq 3.5 \tag{4}$$

When a toric surface is applied to the surface 2 on the side of the eye in order to perform correction of astigmatism, the main line of sight 14 does not become an aggregate, as shown in the next embodiment, and a substantially uniform astigmatic aberration is applied to the main line of sight 14 in order to correct the astigmatism.

Also, as disclosed in detail in Japanese Laid-Open Patent No. 2-39768, when directionality occurs in the refractive power for reasons such as making the eyeglass lens more lightweight and standardization, it is desirable that the astigmatic aberration due to the difference in curvature be generated in a direction that cancels the astigmatic aberration due to the refractive power. Consequently, in such a case, it is desirable that differences be provided for the curvatures C1 and C2 following the main line of sight 14 and the curvatures C3 and C5 of the directions orthogonal to these.

In the progressive multifocal lens 10 of the present embodiment having a progressive refractive surface 5 on the surface 2 on the side of the eye, moving toward the perimeter of the lens, the refractive power Pt following the main line of sight 14 becomes such that a degree is obtained generally being more positive than the refractive power Ps in the orthogonal direction. Consequently, in such a case, in order that the astigmatic aberration be canceled by the refractive powers Pt and Ps, as shown in the following Equation (12), it is desirable that the curvatures C1 and C2 following the main line of sight 14 be rather larger than the curvatures C3 and C5 in the orthogonal directions.

$$C1 > C3$$

$$C2 > C5 \tag{12}$$

Figure 9A:
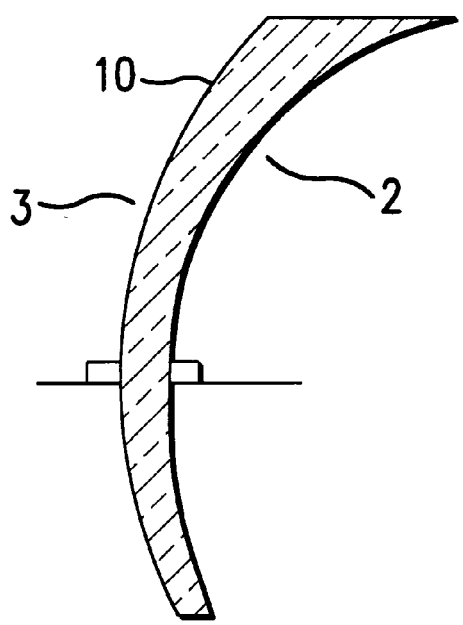
FIG. 9(a) is a sectional view of the progressive multifocal lens of FIGS. 4(a) and 4(b) without a 270° base prismatic power.
Figure 9B:
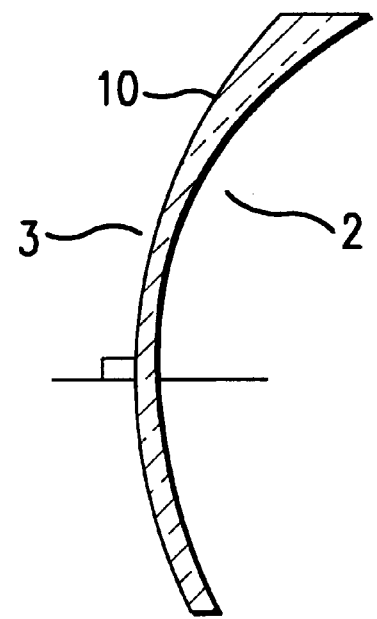
FIG. 9(b) is a sectional view of the progressive multifocal lens of FIGS. 4(a) and 4(b) with a 270° base prismatic power.

Also, as shown in FIG. 9(a), because the progressive multifocal lens 10 of the present embodiment has the surface 2 on the side of the eye as the progressive refractive surface 5, the lens of the distance-vision region 11 becomes thicker than that of the near-vision region 12. Consequently, in order to make the progressive multifocal lens 10 thinner and lighter, it is desirable that a 270° base prismatic power be applied not for the purpose of correction of vision. By this, an extremely thin progressive multifocal lens 10 can be realized as shown in FIG. 9(b). The direction of the prismatic power base is represented as the counter-clockwise angle based on a horizontal line, seeing the direction whereby a light beam introduced perpendicularly to the surface 2 of the lens on the side of the eye inclines due to the prism power, from the surface 3 on the side of the object. Also, for the amount of prism effect applied at this time, the optimal value for the user can be selected between 0.25–3.00 prism diopters.

Also, in the progressive multifocal lens 10 of the present embodiment, because the surface 3 on the side of the object being suitable for an eyeglass lens is convex, and the surface 2 on the side of the eye is concave, the internal vertex power (vertex power) Ps of the distancevision region 11 the join power (join degree) Pa, and the refractive power (base curve) Pb of the surface 3 of the progressive multifocal lens on the side of the object must be set so as to satisfy the following Equation (6) described above.

$$Pb > Ps + Pa \tag{6}$$

By selecting the vertex power Ps, join degree Pa, and base curve Pb so as to satisfy this Equation (6), it can be made as a meniscus-shaped progressive multifocal lens 10, and an eyeglass lens fitting the face can be provided.

Embodiment 2

Figure 10A:
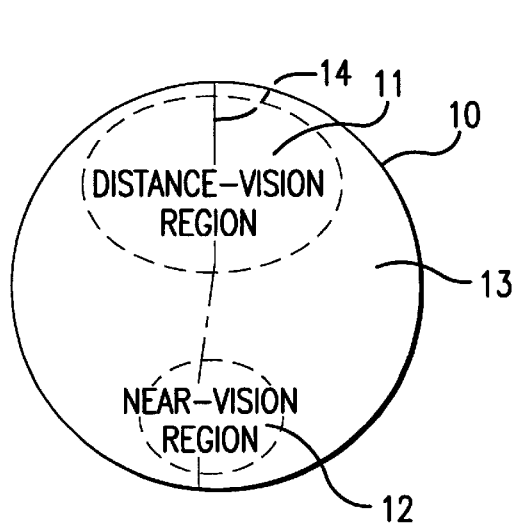
FIG. 10(a) is a front view of a second embodiment of the progressive multifocal lens of this invention.
Figure 10B:
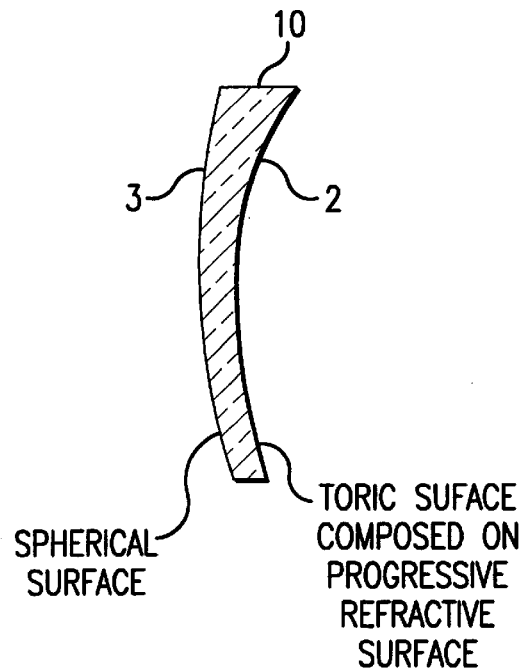
FIG. 10(b) is a sectional view of the progressive multifocal lens of FIG. 10(a) along a main line of sight.

FIGS. 10(a) and 10(b) show a progressive multifocal lens 10 having the properties of a progressive refractive surface 5 and a toric surface 6 provided on the surface of the present invention on the side of the eye. In the following, in order to be distinguished from the progressive refractive surface of the present embodiment having both functions of vision correcting properties and astigmatism correcting properties formed on the surface 2 on the side of the eye, the progressive refractive surface established only for the purpose that the surface on the side of the eye demonstrate the desired vision correcting properties is called the original progressive refractive surface, and the toric surface established only for the purpose that the surface on the side of the eye demonstrate the intended astigmatism correcting properties is called the original toric surface The progressive multifocal lens 10 of the present embodiment is designed and manufactured by a procedure shown using the flow chart in FIG. 13. First, in step ST1, the original progressive refractive surface is sought by parameters meeting the conditions of the user such as the extent of aging vision and the method of using eyeglasses, and that result is recorded as coordinates or curvatures, or the like. In step ST2, the original toric surface for correcting the user's astigmatism is sought, and that result is recorded as curvatures. Of course, it may be recorded also as coordinates.

In step ST3, all the coordinates of the surface on the side of the eye having the vision correcting and astigmatism correcting properties are sought using the results of step ST1 and ST2. In the present embodiment, in step ST3, the values Z of the z coordinates of the surface 2 on the side of the eye are sought using the following Composite Equation (5) as described above.

$$Z = \frac{(Cp + Cx) X^2 + (Cp + Cy) Y^2}{1 + \sqrt{(1 - (Cp + Cx)^2 X^2 - (Cp + Cy)^2 Y^2)}} \tag{5}$$

Figure 28A:
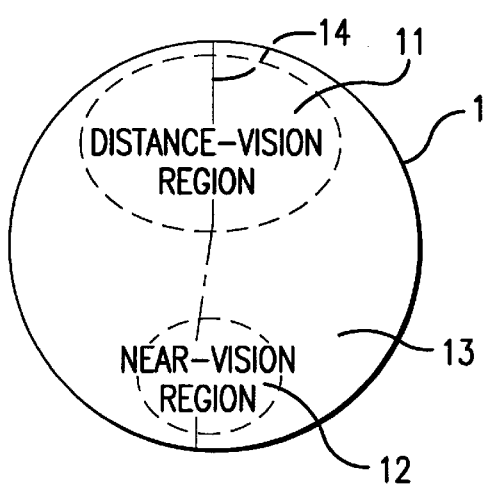
FIG. 28(a) is a front view of a conventional progressive multifocal lens for correction of astigmatism.
Figure 28B:
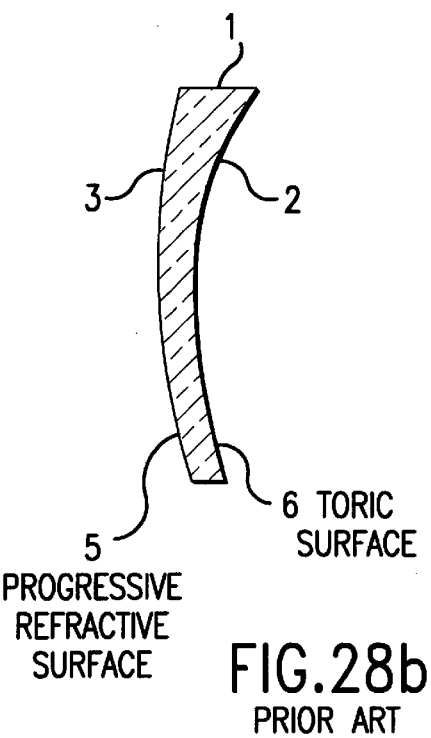
FIG. 28(b) is a sectional view of the conventional progressive multifocal lens of FIG. 28(a) along a main line of sight.

Also, by using this Composite Equation (5), a progressive multifocal lens can be provided, having a function that performs correction of astigmatism for correction of vision, just as with the conventional progressive multifocal lens shown in FIGS. 28(a) and 28(b).

Figure 11:
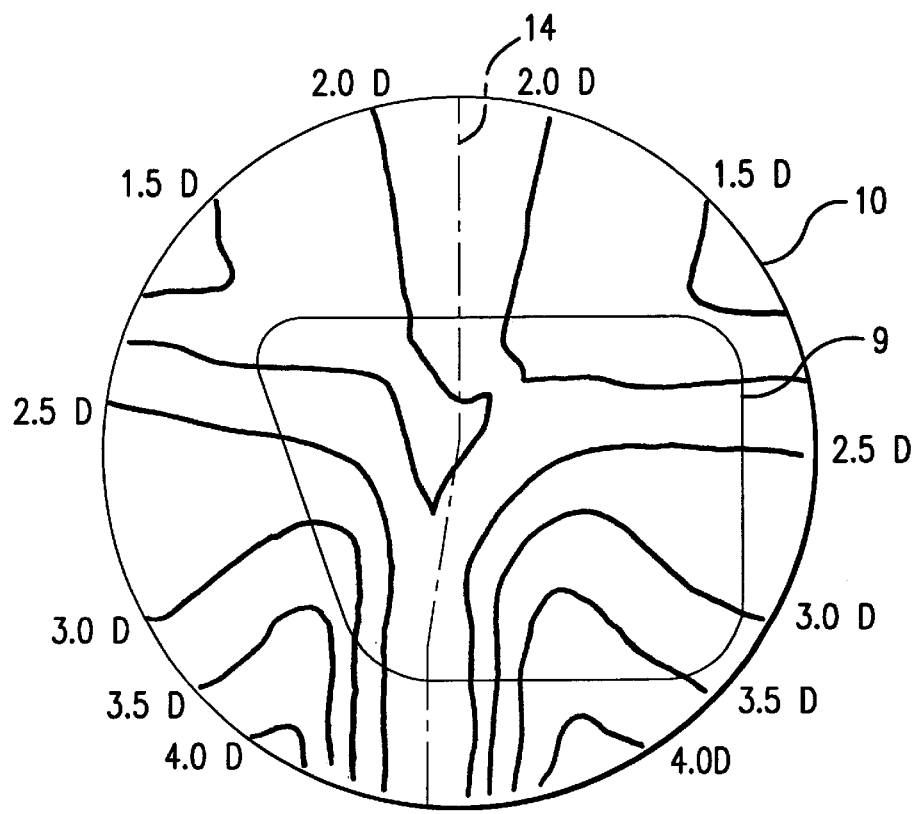
FIG. 11 is a drawing showing the astigmatic aberration of the progressive multifocal lens shown in FIGS. 10(a) and 10(b).
Figure 29:
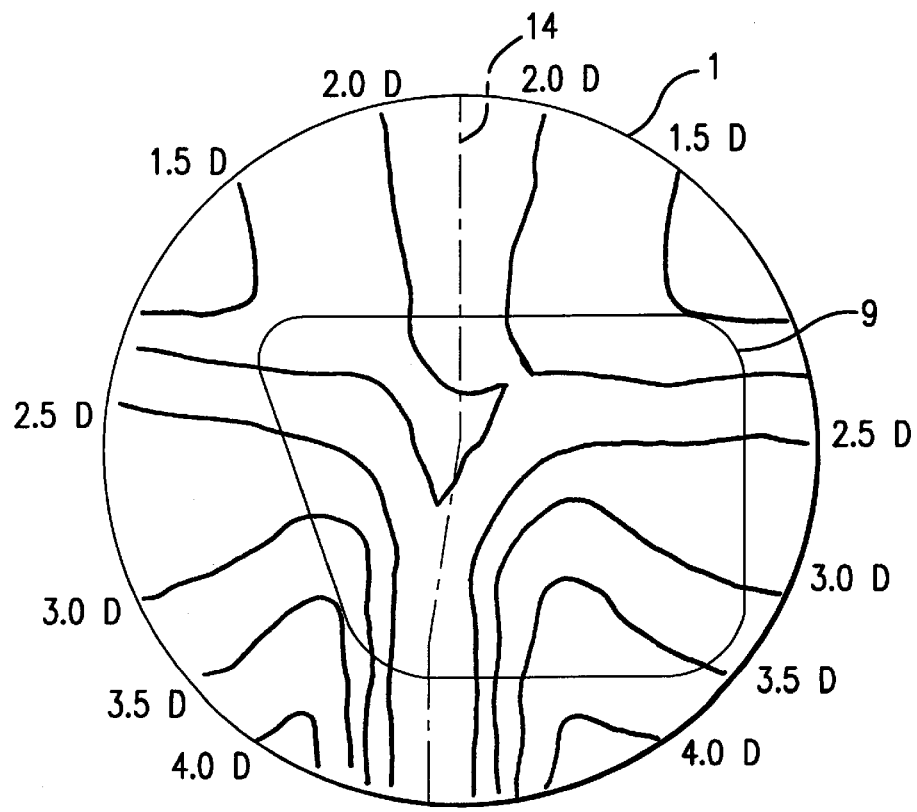
FIG. 29 is a drawing showing the astigmatic aberration of the progressive multifocal lens shown in FIGS. 28(a) and 28(b).

FIG. 11 shows a drawing of the astigmatic aberration of the progressive multifocal lens 10 of the present invention, corresponding to the conventional progressive multifocal lens shown in FIG. 29, having progressive refractive surface on the surface 3 on the side of the object, and a toric surface on the surface 2 on the side of the eye.

Figure 12:
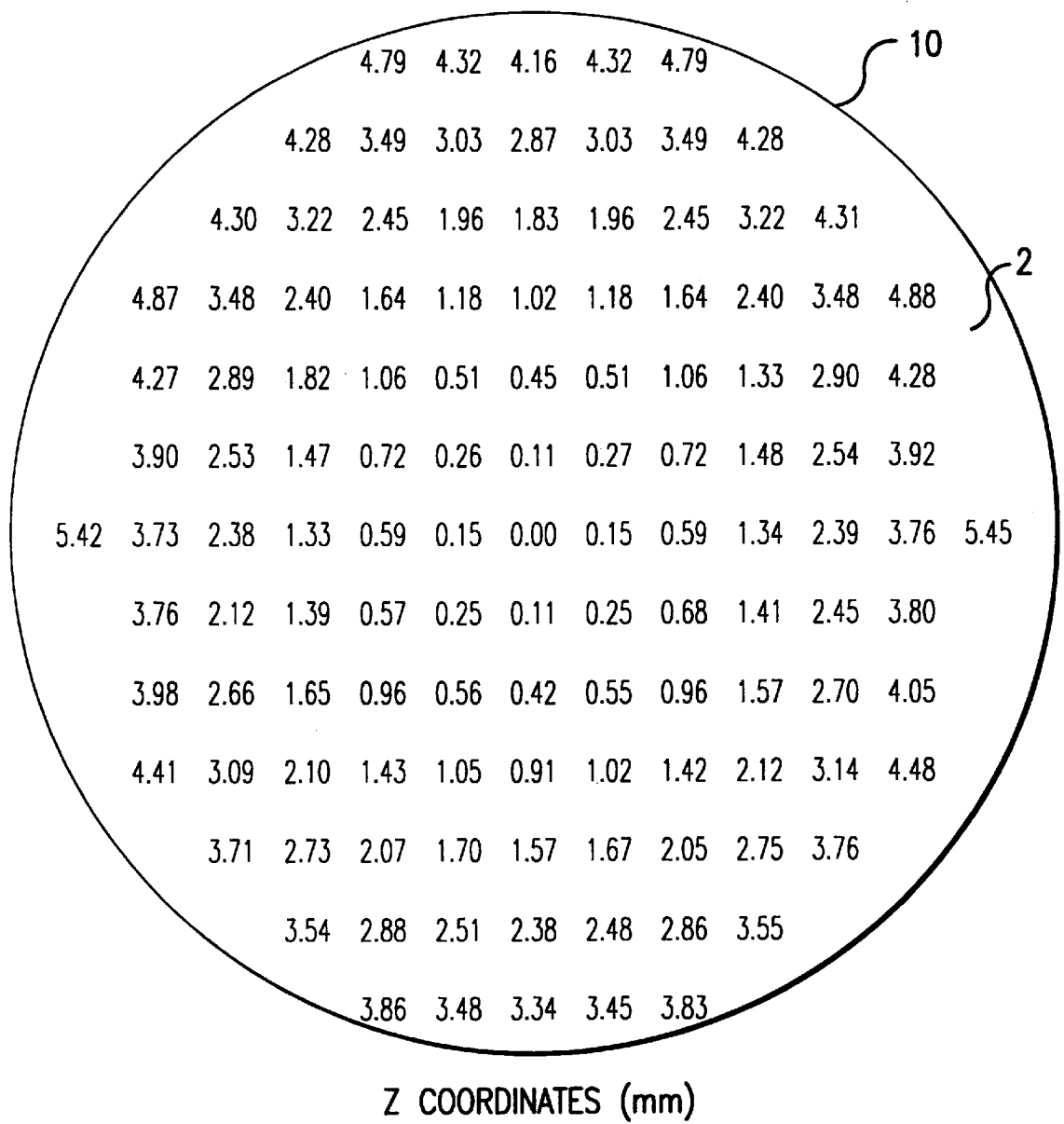
FIG. 12 is a drawing showing the z coordinates of the surface on the side of the eye of the progressive multifocal lens shown in FIGS. 10(a) and 10(b).

Also, FIG. 12 shows the values of the z coordinates of the progressive multifocal lens 10 of the present embodiment. By composing the original progressive refractive surface 5 shown in FIG. 6 and the original toric surface 6 shown in FIG. 30 using the above Equation (5), a surface 2 on the side of the eye can be composed, having the values Z of the z coordinates such as shown in FIG. 12.

The progressive multifocal lens 10 of the present invention is formed using this surface 2 on the side of the eye and a spherical surface 3 on the side of the object, and a progressive multifocal lens for correction of astigmatism such as shown in FIG. 11 can be obtained, having substantially identical astigmatic aberration as that of FIG. 29. Consequently, according to the present invention, a progressive multifocal lens 10 can be obtained, having the equivalent vision correcting power and astigmatism correcting power as the conventional progressive multifocal lens having the progressive refractive surface on the surface 3 on the side of the object and the toric surface on the surface 2 on the side of the eye.

Thus, in the present embodiment, the curvature of a toric surface for correction of astigmatism can be applied to the surface on the side of the eye in addition to the curvature of a progressive refractive surface for correction of vision, and it can be made such that the surface on the side of the eye has an astigmatism correcting property, that is, a cylinder power. Consequently, because a progressive refractive surface having vision correcting power and astigmatism correcting power can be prepared on the side of the eye, in addition to the vision correcting power and the astigmatism correcting power, the difference in magnification between the distance-vision region 11 and the near-vision region 12 can be reduced, and a progressive multifocal lens 10 can be provided, whereby the jumping and warping of images is reduced.

Figures 13, 14:
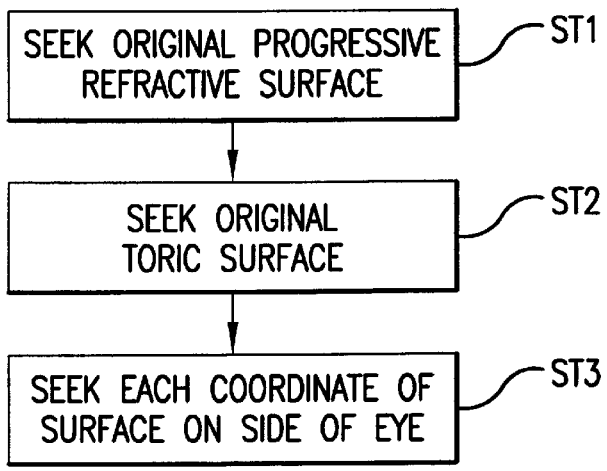
FIG. 13 is a flow chart showing the manufacturing process of a progressive multifocal lens of the present invention having a vision correcting capability and an astigmatism correcting capability.
FIG. 14 is a drawing showing the difference an magnification between the distance-vision region and the near-vision region of a progressive multifocal lens of the present invention having a vision correcting capability and an astigmatism correcting capability as an example, compared with a conventional progressive multifocal lens.

As shown in FIG. 14, when the difference in magnification between near and far of the progressive multifocal lens 10 of the present embodiment is compared with a conventional lens, it can be improved by 12–13% in either the 90° direction or the 180° direction, and according to the present invention, it is clear that jumping and warping can be reduced even in a progressive multifocal lens for correction of astigmatism. Consequently, by globe processing the progressive multifocal lens 10 of the present embodiment according to the eyeglass frame, it becomes possible to provide an eyeglass lens 9 capable of correcting vision and astigmatism, and exhibiting extremely low jumping and warping of images. Therefore, according to the eyeglass lens 9 of the present invention, a comfortable visual field can be provided even for users having astigmatism.

For the progressive multifocal lenses 10 in FIG. 11 and FIG. 12, the base curve Pb indicating the refractive power of the surface 3 on the side of the object is a constant 4.00 D. For the surface 2 on the side of the eye, the refractive power is the same as that of Embodiment 1. The average surface refractive power of the distance-vision region 11 is set to 6.00 D, the average surface refractive power of the near-vision region 12 is set to 4.00 D, and the join degree Pa is set to 2.00 D. As opposed to this, a toric surface is composed, having an astigmatic axis of 90°, a spherical power S of −2.00 D, and a cylinder power C of −2.00 D. Also, the center thickness t of the lens is 3.0 mm, and the lens diameter d is 70.0 mm.

Figure 15A:
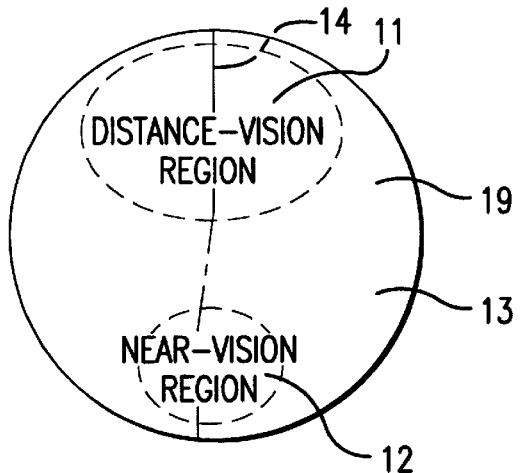
FIG. 15(a) is a front view of a lens corresponding to the second embodiment of the progressive multifocal lens of this invention with an original progressive refractive surface and an original toric surface.
Figure 15B:
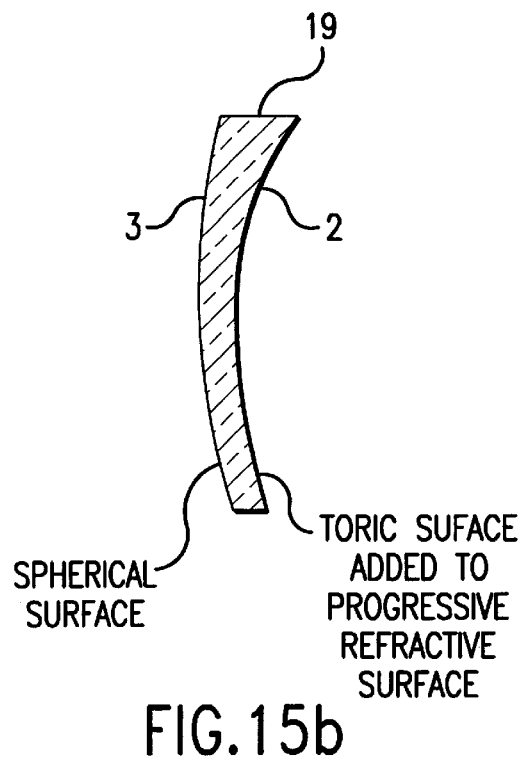
FIG. 15(b) is a sectional view of the progressive multifocal lens of FIG. 15(a) along a main line of sight.
Figure 30:
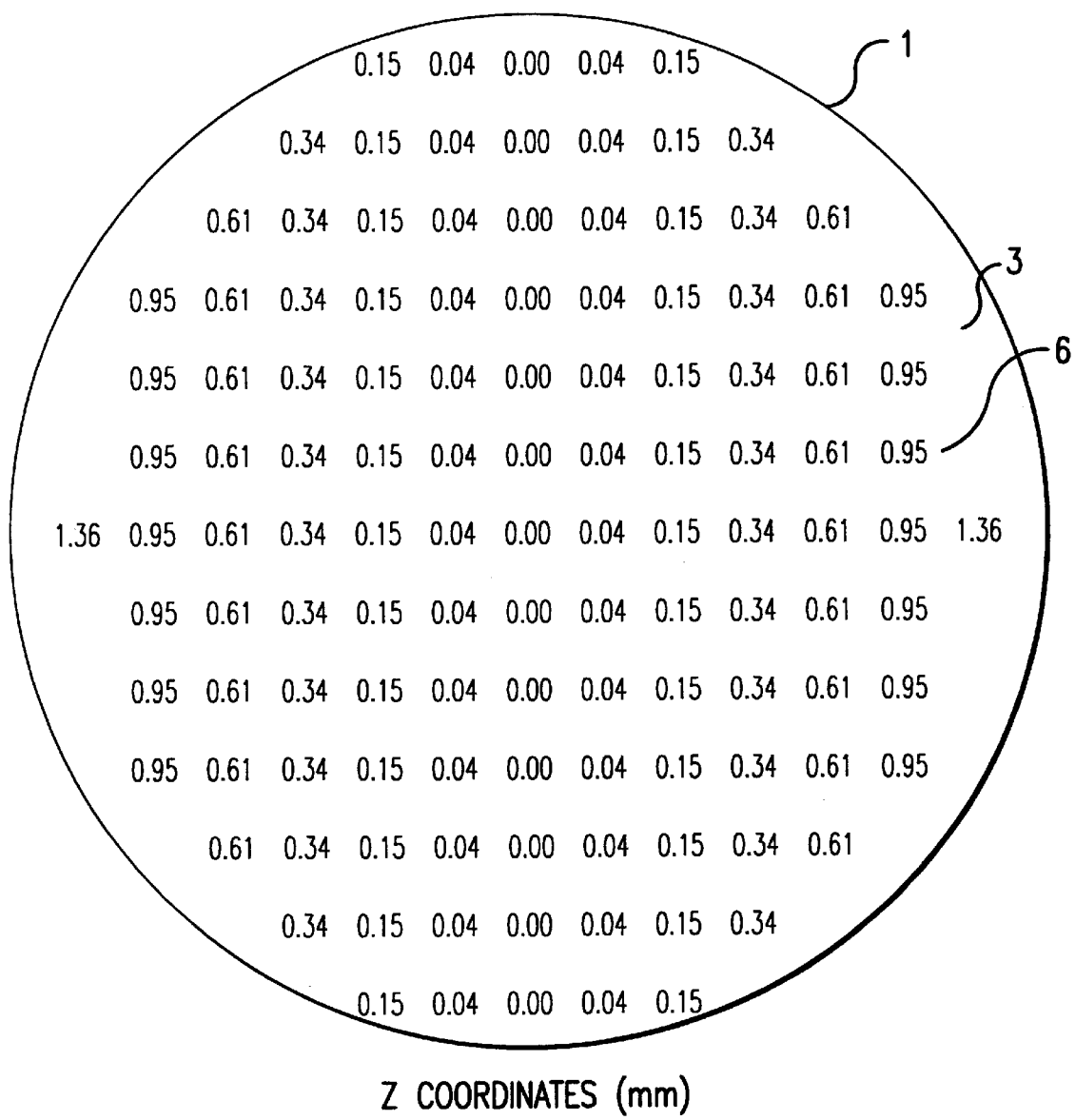
FIG. 30 is a drawing showing the z coordinates of the toric surface on the side of the eye of the progressive multifocal lens shown in FIGS. 28(a) and 28(b).

FIGS. 15(a) and 15(b) shows a lens 19 having a progressive refractive surface formed on the surface 2 on the side of the eye by adding the values of the z coordinates of the original toric surface shown in FIG. 30 to the values of the z coordinates of the original progressive refractive surface shown in FIG. 6 instead of using Composite Equation (5) mentioned above.

Figure 16:
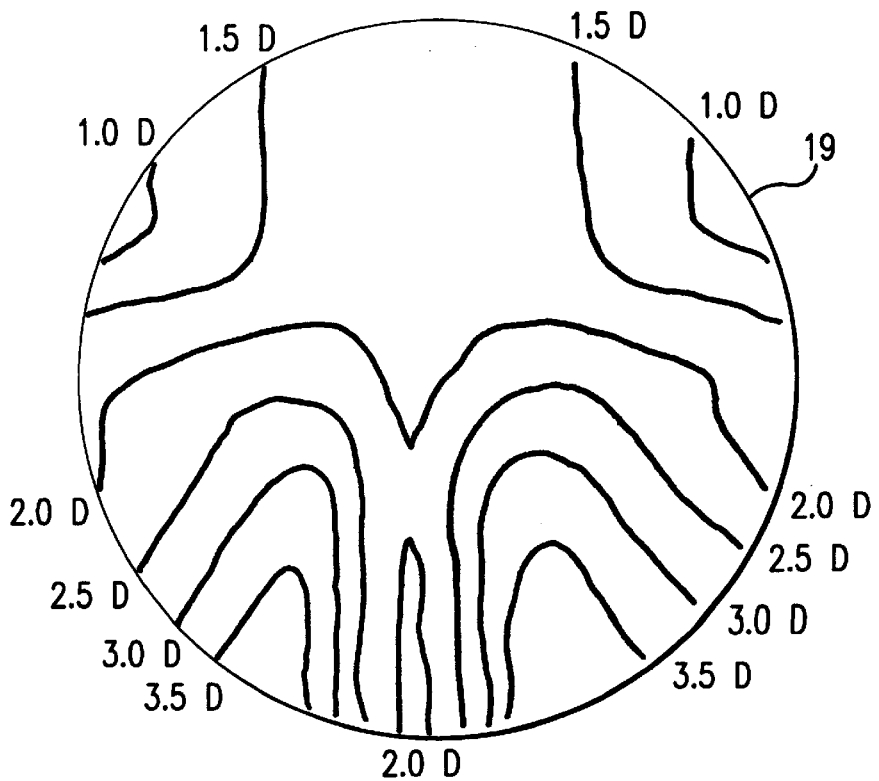
FIG. 16 is a drawing showing the astigmatic aberration of the lens shown in FIGS. 15(a) and 15(b).
Figure 17:
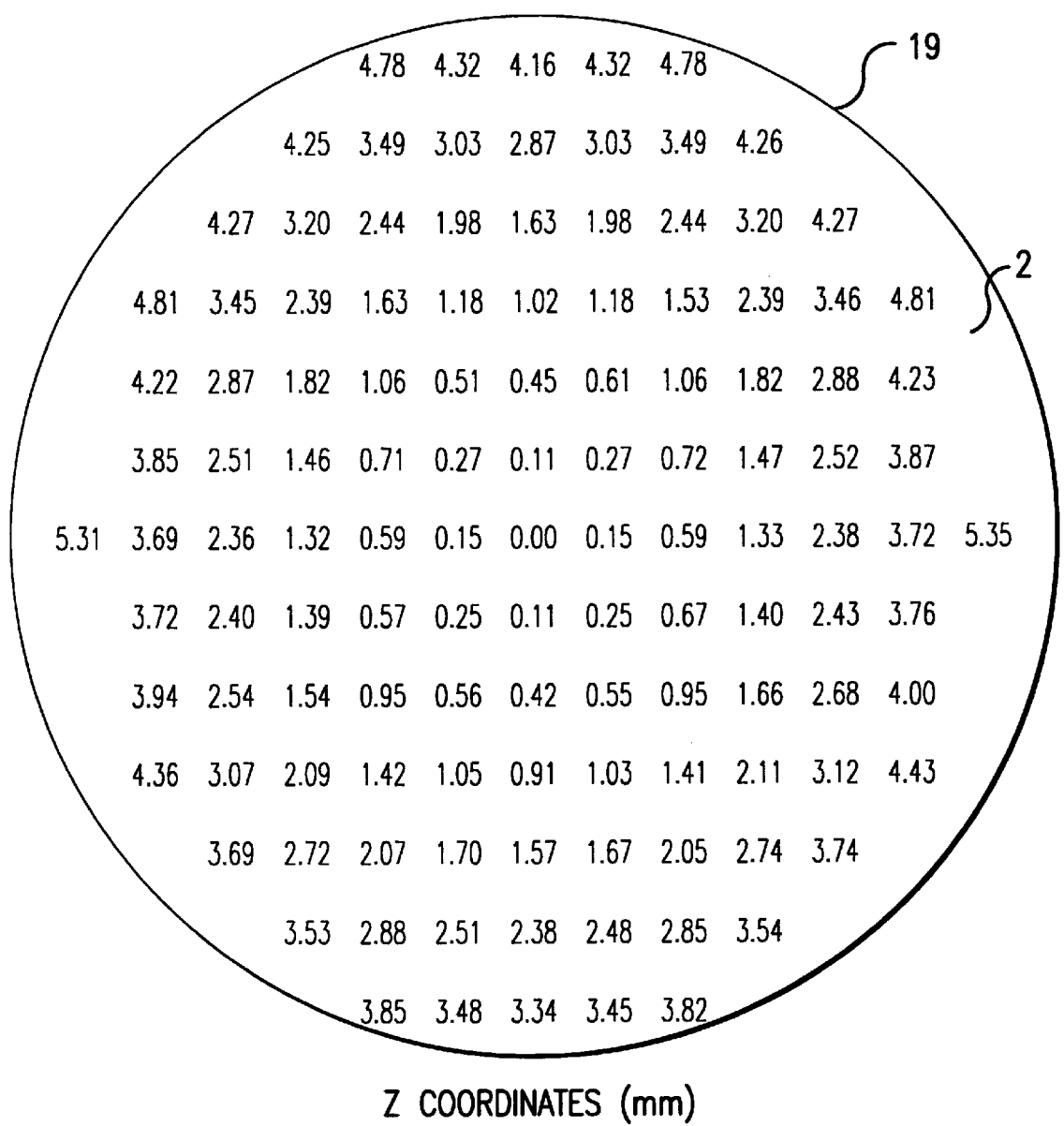
FIG. 17 is a drawing showing the z coordinates of the surface on the side of the eye of the lens shown in FIGS. 15(a) and 15(b).

Also, FIG. 16 shows a drawing of the astigmatic aberration of the lens 19, and FIG. 17 shows the z coordinates of the surface 2 of the lens 19 on the side of the eye. A progressive refractive surface can be formed, having vision correcting properties and astigmatism correcting properties by adding the values of the z coordinates of the original toric surface to the values of the z coordinates of the original progressive refractive surface. Nevertheless, as is clear from FIG. 16, when Composite Equation (5) described above is not used, it is clear that it is difficult to achieve an astigmatic aberration equivalent to that of the conventional progressive multifocal lens shown in FIG. 29, and it is difficult to achieve vision correcting and astigmatism correcting powers exactly equal to those of the conventional progressive multifocal lens for correction of astigmatism.

Figure 18:
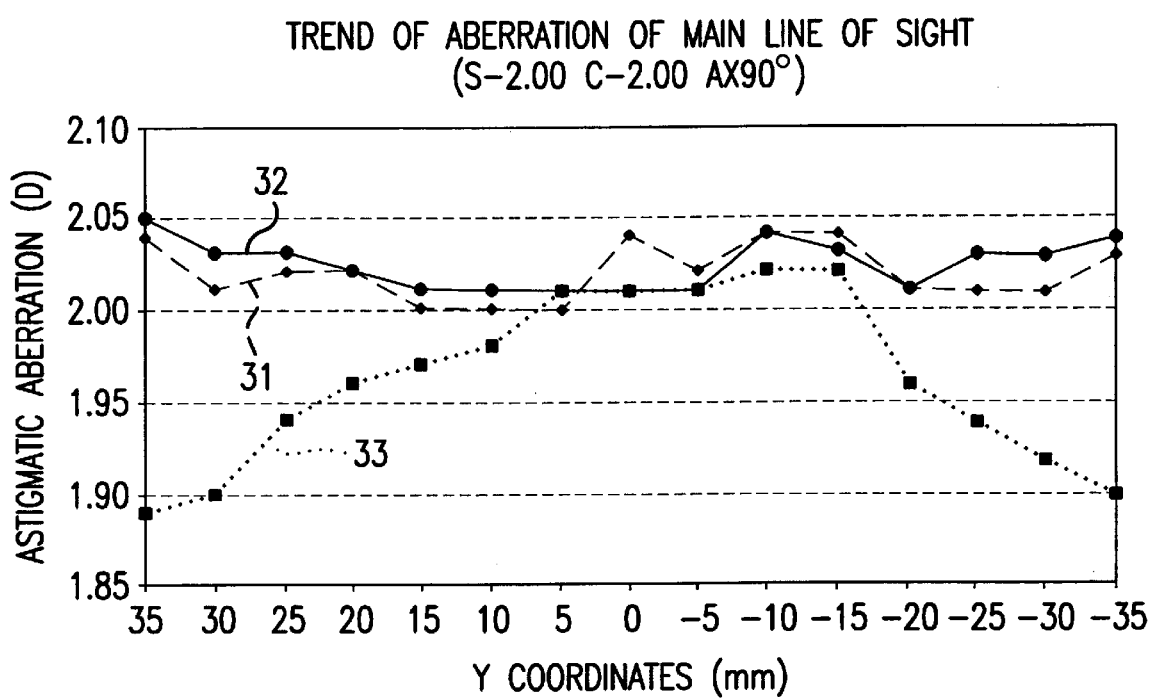
FIG. 18 is a graph showing the variation of astigmatic aberration following the main line of sight of the progressive multifocal lens of Embodiment 2 of the present invention shown in FIGS. 10(a) and 10(b), along with the same of the conventional progressive multifocal lens shown in FIG. 28 and the lens shown in FIGS. 15(a) and 15(b).

This condition appears also in the variation of the astigmatic aberration following the main line of sight 14 of the various progressive multifocal lenses shown in FIG. 18. In FIG. 18, the broken line with black circles 31 show the absolute values of the astigmatic aberration following the main line of sight 14 of the conventional progressive multifocal lens 1 for correction of astigmatism shown in FIG. 29, and the solid line with black circles 32 shows the absolute values of the astigmatic aberration following the main line of sight 14 of the progressive multifocal lens 10 for correction of astigmatism formed using Composite Equation (5).

As is clear from this drawing, in the progressive multifocal lens 10 of the present embodiment having composed the surface 2 on the side of the eye is determined using Composite Equation (5), a 2D astigmatic aberration that does not harm the vision correcting power intended for correction of astigmatism can be secured with extreme stability substantially across the entire region of the main line of sight in the same manner as the conventional progressive multifocal lens 1.

As opposed to this, in the progressive refractive surface of the lens 19 of FIG. 16, simply having added the coordinates of the original toric surface to the coordinates of the original progressive refractive surface, it is granted that a 2D astigmatic aberration intended for correction of astigmatism can be achieved following the main line of sight, as shown by the broken line with black squares in FIG. 18. However, it becomes difficult to secure a stable astigmatic aberration compared with the lens 10 in which Composite Equation (5) was used.

In particular, the astigmatic aberration in the perimeter area of the lens 19 is great, and it is difficult to secure an astigmatic aberration for correction of astigmatism. Also, because the variation of the astigmatic aberration is comparatively large, compared with the progressive multifocal lens 10 manufactured using Composite Equation (5), the images easily jump and warp when the eye moved along the main line of sight. Thus, it is clear that a progressive multifocal lens can be provided, having a more comfortable visual field and having little jumping, by composing the original progressive refractive surface and the original toric surface using Composite Equation (5).

In the above examples are shown cases when a prescription having established the spherical power of the toric surface was applied in the vertical direction (90° axis) of the lens (that is, when a prescription having established the cylinder power of the toric surface was applied in the left-right direction of the lens), but it is obvious that the present invention is not limited to this. That is, the direction of the xy axis is not limited to the directions described above, rather it can be established in a suitable direction, and the prescriptions described above can be performed with those coordinates.

For example, even when a prescription having established the spherical power of the toric surface is applied in the left-right direction of the lens, it is possible to provide a method of composition using Equation (5) of the present embodiment by only applying an operation rotating the directions of the x axis and the y axis, respectively, of the xy coordinates 90° to the left in relation to the examples described above, in combination with Equation (5). Furthermore, even when a prescription having established the spherical power of the toric surface is applied in any direction (including diagonal directions) of the lens, it is possible to provide a method of composition using Equation (5) of the present embodiment by only applying an operation that rotates by $\alpha$ degrees ($\alpha$ is any angle of 0–360°) the x-axis and the y axis, respectively, of the xy coordinates.

In such cases, it is described above that determination of the progressive refractive surface not having the astigmatism correcting power (the original progressive refractive surface), as shown in Embodiment 1, is performed first. Also, during the computation of Equation (5) thereafter, it is necessary to use the same coordinate systems as the coordinate system representing the original progressive refractive surface and the coordinate system representing the toric surface.

Consequently, in the determination of the original refractive surface not having the astigmatism correcting power using Equation "5", it is desirable to use a coordinate system that matches the coordinate system representing the toric system, which has been rotated by $\alpha°$ to the left. This simplifies the computation.

Figure 19:
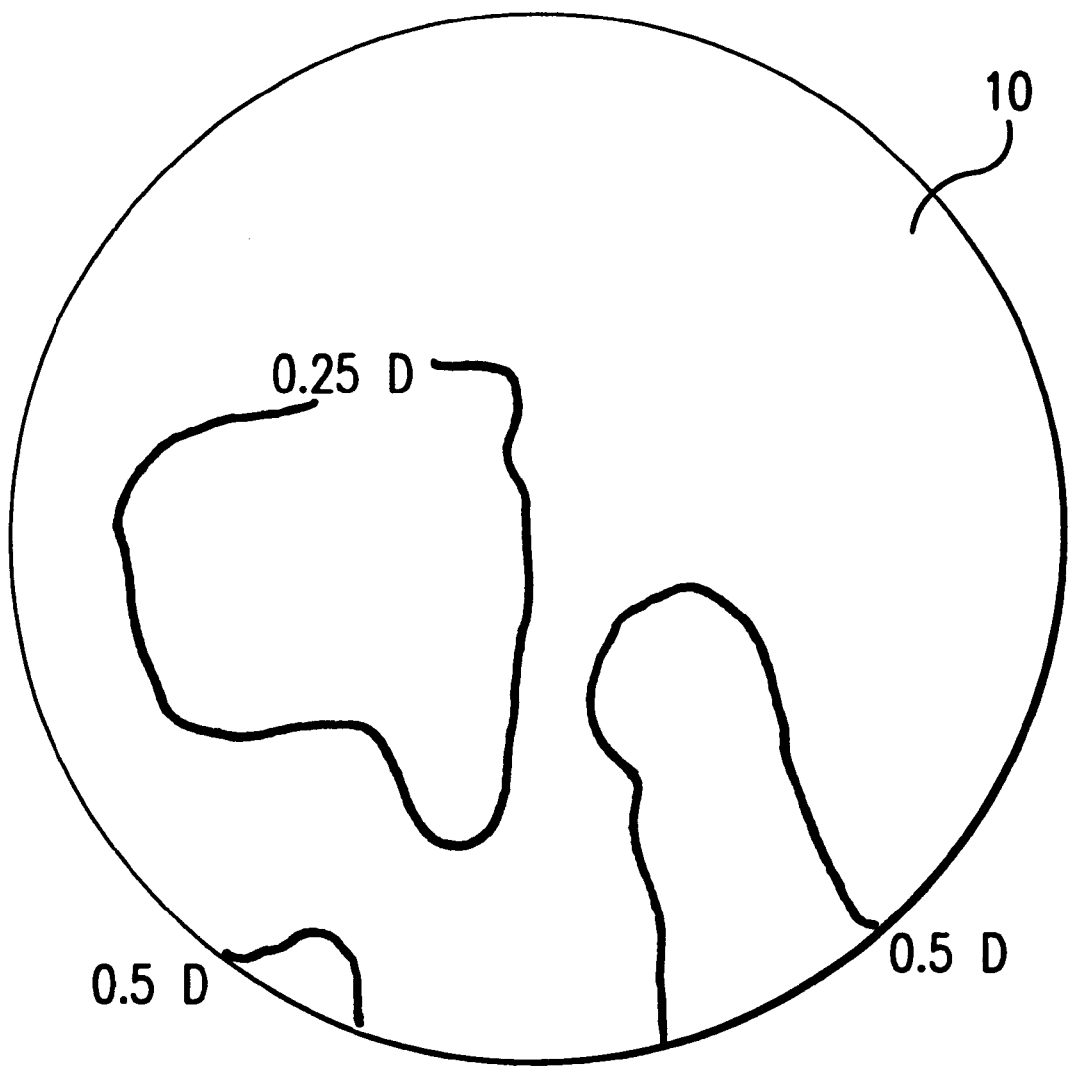
FIG. 19 is a drawing showing the astigmatic aberration of a progressive multifocal lens of a third embodiment of the present invention.
Figure 20:
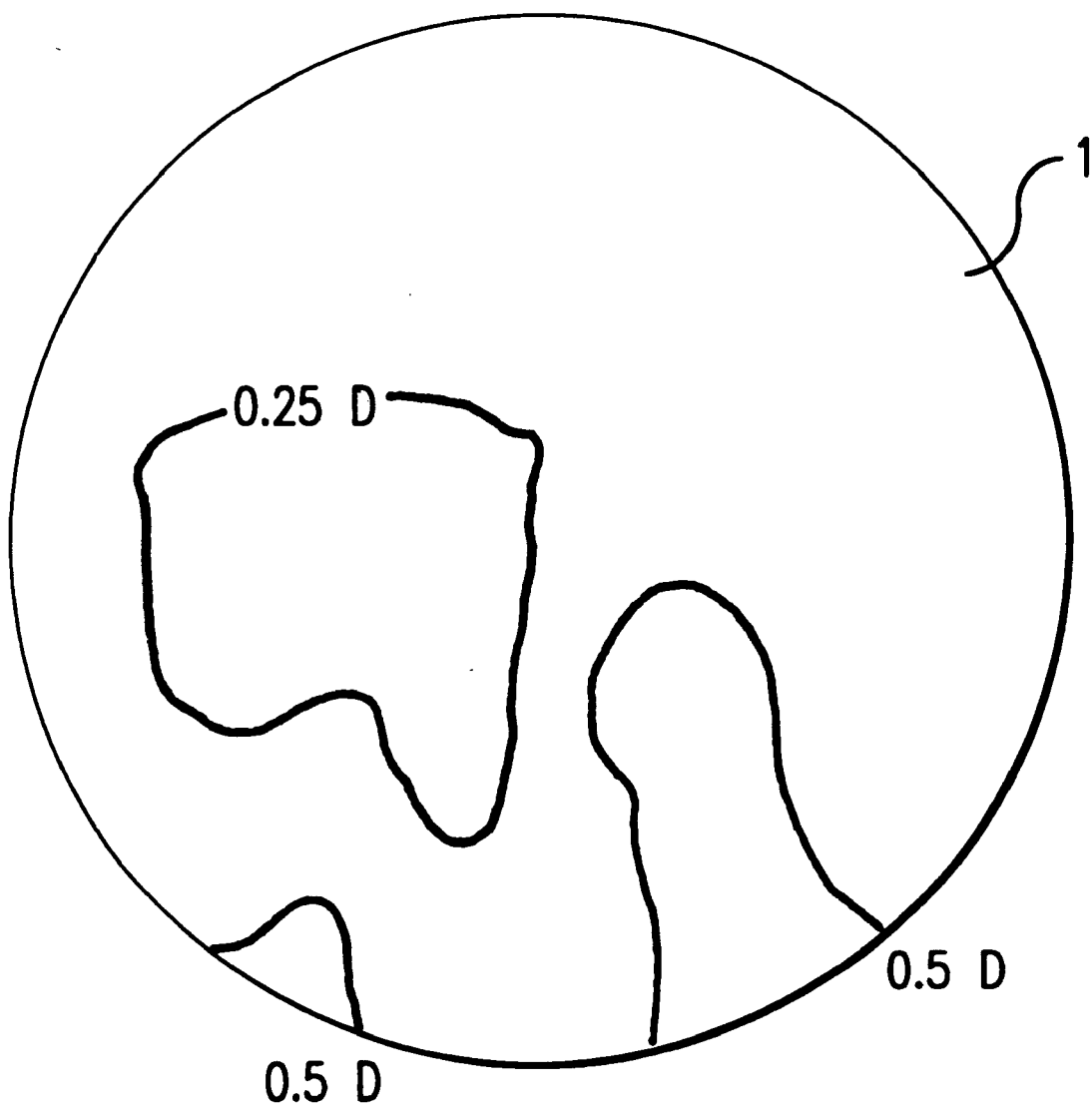
FIG. 20 is a drawing showing the astigmatic aberration of a conventional progressive multifocal lens corresponding to the progressive multifocal lens shown in FIG. 19.

From FIG. 19 to FIG. 24, there are shown other examples of a progressive multifocal lens 10 for correction of astigmatism that are formed using Composite Equation (5) of the present invention under other conditions. FIG. 19 shows the astigmatic aberration of a progressive multifocal lens 10 formed whereby the original progressive refractive surface 5 and the original toric surface 6 are composed by Composite Equation (5) into a condition nearest to the spherical surface. The progressive multifocal lens 10 of this embodiment is designed such that the sphere power S is 0.00 D, the cylinder power C is –0.25 D, the astigmatic axis is 45°, and the join degree Pa is 0.50 D, and it shows the astigmatic aberration of the conventional progressive multifocal lens 1 designed under the same conditions as in FIG. 20. As is clear by comparing FIG. 19 and FIG. 20, by using Composite Equation 5, a progressive multifocal lens 10 can be obtained having an astigmatic aberration substantially equal to that of the conventional progressive multifocal lens 1 and regarding the powers of vision correction and astigmatism correction, a progressive multifocal lens can be obtained having capabilities equal to those of the conventional lens 1.

Furthermore, because the progressive multifocal lens 10 of the present embodiment provides to the surface 2 on the side of the eye a curvature exhibiting the functions of a progressive refractive surface 5 and a toric surface 6, the surface 3 on the side of the object can be made such that the base curve is a constant spherical surface. Consequently, the difference in magnification between the distance-vision region and the near-vision region can be made smaller in the same manner as the embodiments described above. Also, because the variation in magnification of the progressive region can be made smaller, a comfortable visual field exhibiting little jumping and warping of images can be provided to the user.

Figure 21:
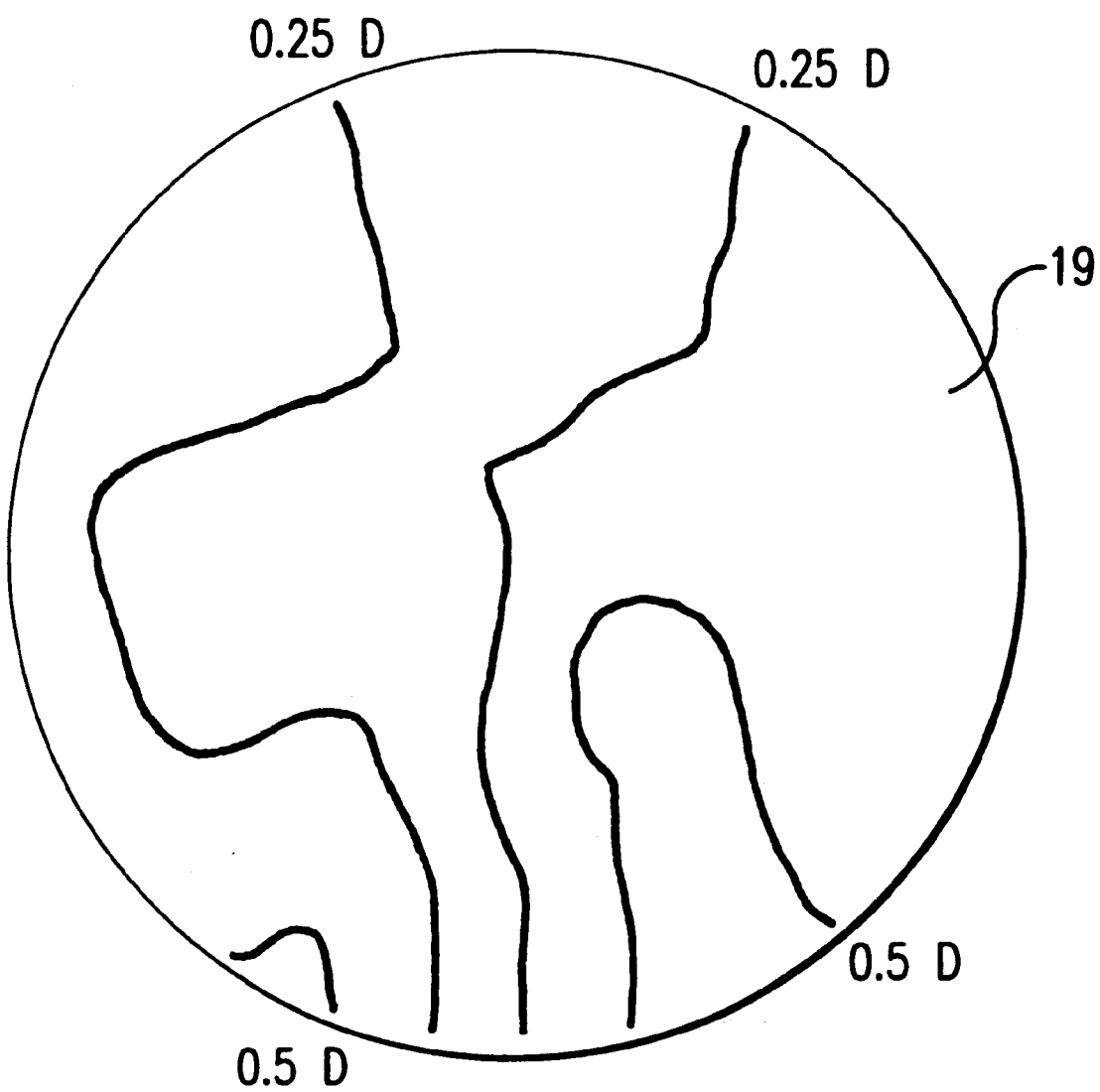
FIG. 21 is a drawing showing the astigmatic aberration of a progressive multifocal lens formed without using the composite equation corresponding to FIG. 19.

In this example as well, the astigmatic aberration of a lens 19 formed by simply adding the z coordinates of the original progressive refractive surface and the coordinates of the original toric surface on the surface 2 on the side of the eye is shown in FIG. 21. When the condition of astigmatic aberration shown in this drawing is compared with the conditions of astigmatic aberration of FIG. 19 and FIG. 20, it is clear, with regards to astigmatic aberration that a lens can be provided having the same capabilities as those of the conventional progressive multifocal lens 1. Consequently, because the jumping and warping of images can be reduced using the present invention, a progressive multifocal lens can be provided that is more comfortable when worn as an eyeglass lens than a conventional progressive multifocal lens.

Figure 22:
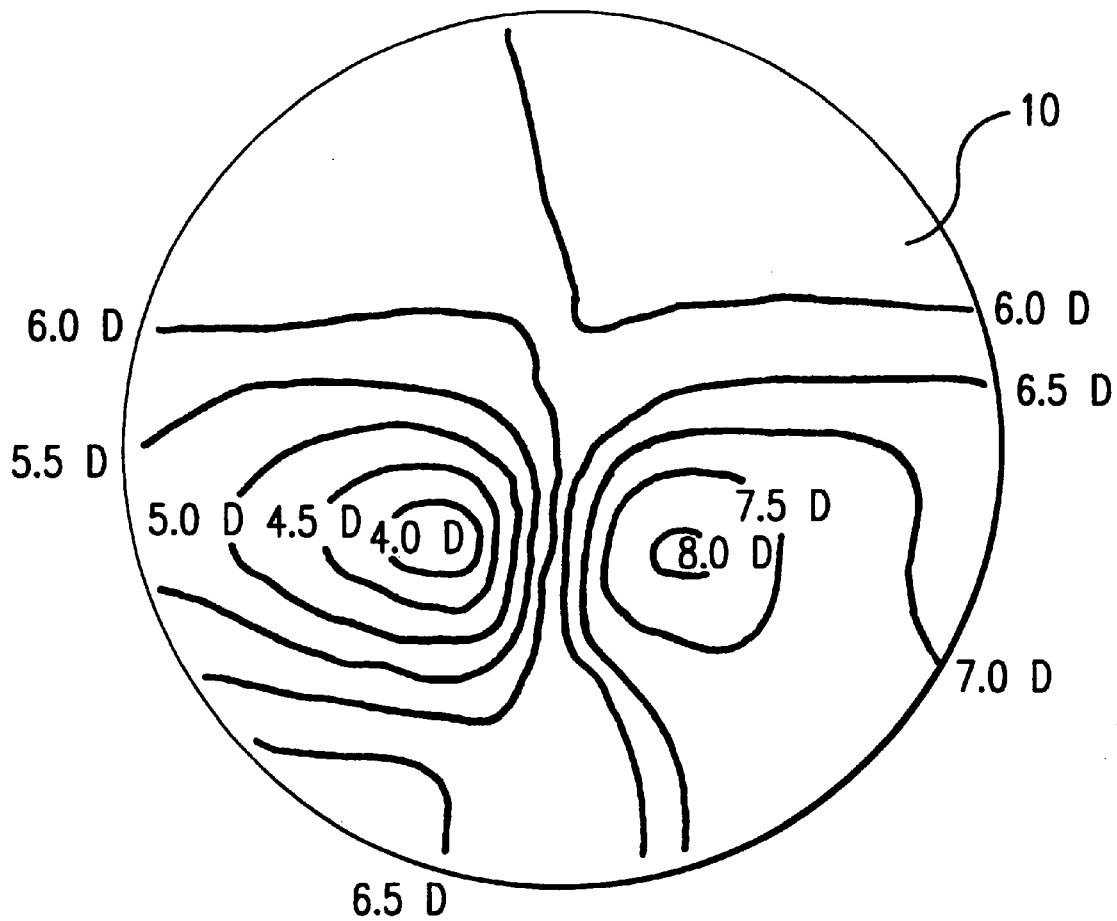
FIG. 22 is a drawing showing the astigmatic aberration of a progressive multifocal lens of a fourth embodiment of the present invention.

FIG. 22 shows the astigmatic aberration of a progressive multifocal lens 10 of the present invention formed whereby the original progressive refractive surface 5 and the original toric surface 6 are composed by Composite Equation (5) into a condition most deviating from the spherical surface, and it is an example of a progressive multifocal lens of the present invention whereby the variation of the z coordinates of the composite surface 2 on the side of the eye is made greatest.

Figure 23:
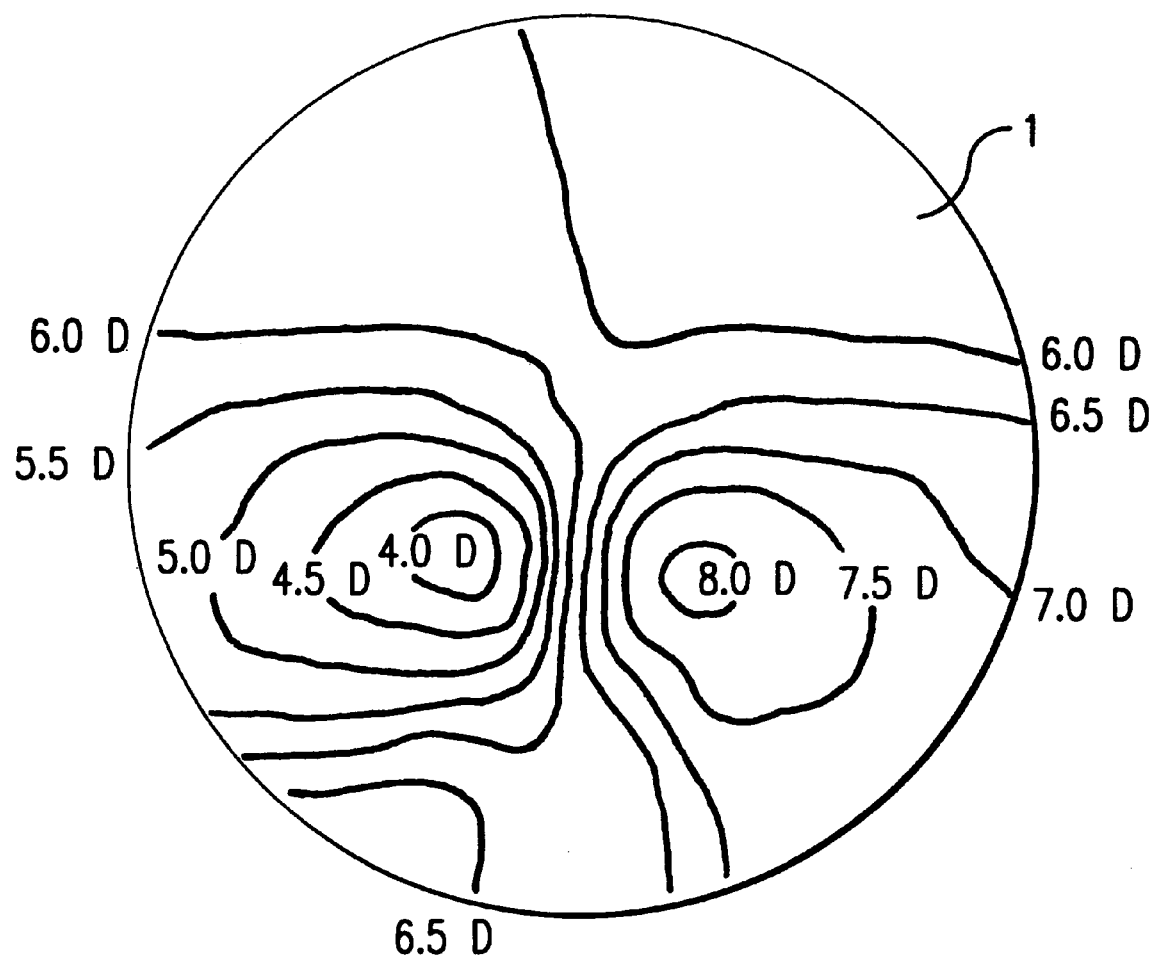
FIG. 23 is a drawing showing the astigmatic aberration of a conventional progressive multifocal lens corresponding to the progressive multifocal lens shown in FIG. 22.

The progressive multifocal lens 10 of this embodiment is designed such that the spherical power S is 0.00 D, the cylinder power C is –6.00, the astigmatic axis is 45°, and the join degree Pa is 3.50 D, and it shows the astigmatic aberration of the conventional progressive multifocal lens 1 designed under the same conditions as in FIG. 23. As is clear by comparing FIG. 22 and FIG. 23, by using Composite Equation (5) a progressive multifocal lens 10 can be obtained having an astigmatic aberration substantially equal to that of the conventional progressive multifocal lens 1.

Thus, Composite Equation (5) of the present invention is effective in composing all ranges of surfaces where the progressive refractive surface 5 has a join degree Pa of 0.5–3.5 D, and the toric surface 6 has a cylinder power C of 0.25–6.00 D. Consequently, by using Composite Equation (5) of the present invention, a progressive multifocal lens can be provided having the progressive refractive surface on the surface 2 on the side of the eye, whereby the jumping and warping of images is reduced greatly.

Figure 24:
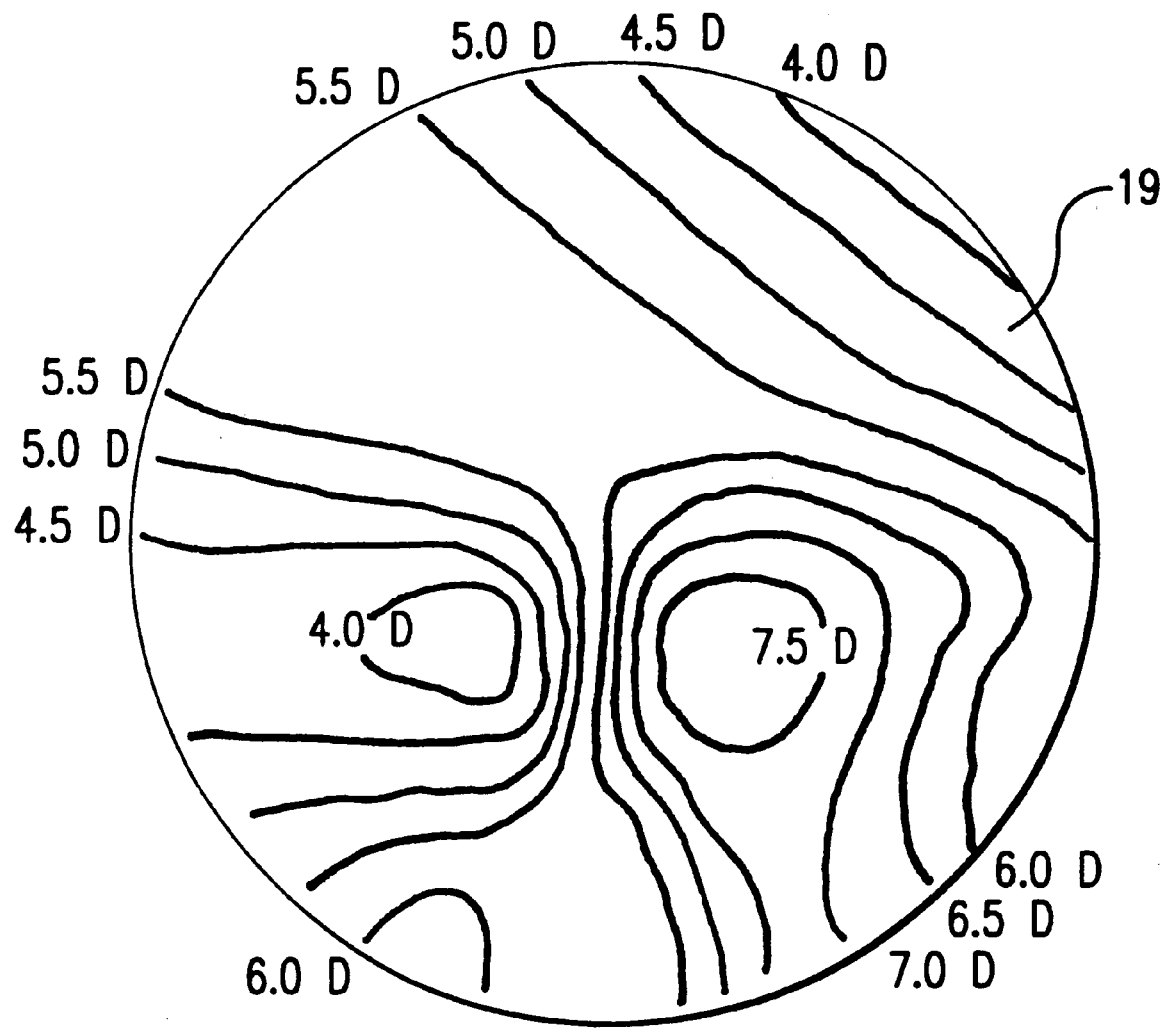
FIG. 24 is a drawing showing the astigmatic aberration of a progressive multifocal lens formed without using the composite equation corresponding to FIG. 22.

In this example as well, the astigmatic aberration of a lens 19 formed by simply having added the z coordinates of the original progressive refractive surface and the coordinates of the original toric surface on the surface 2 on the side of the eye is shown in FIG. 24. As is clear from this drawing, by using Composite Equation (5) in the present embodiment as well, an internal progressive multifocal lens can be provided having an improved astigmatic aberration compared with a lens having added the z coordinates of the original progressive refractive surface and the original toric surface.

As explained above, in the progressive multifocal lens of the present invention, by placing the progressive refractive surface on the surface on the side of the eye, it becomes possible to break free from designs where the surface on the side of the object must be non-spherical, and to form the surface on the side of the object can so that the base curve is a constant spherical surface. Consequently, because the variation of the magnification SM due to the shape factor Ms caused on the surface on the side of the object, it becomes possible to reduce the difference in magnification between the distance-vision region and the near-vision region.

Therefore, even in a situation in which design technology for progressive refractive surfaces has advanced, and the jumping and warping of images have been suppressed to a limit by improving the astigmatic aberration appearing on the progressive multifocal lens, a progressive multifocal lens according to the present invention can be provided that further improves the jumping and warping of images caused by the difference in magnification between the distance-vision region and the near-vision region. Particularly in a progressive multifocal lens having a high join degree of the difference of refractive power of the distance-vision region and the near-vision region, by using the progressive multifocal lens of the present invention, the jumping and warping of images can be improved greatly.

Consequently, according to the present invention, it becomes possible to provide a comfortable visual field for the user of a progressive multifocal lens having a high join degree that aggravates the jumping and warping of images.

Also, in the present invention, a composite equation is provided that can demonstrate a specified performance by composing the progressive refractive surface and the toric surface for correction of astigmatism on the surface on the side of the eye. By using this composite equation, the jumping and warping of images can be improved, even in a progressive multifocal lens for correction of astigmatism, by providing the progressive refractive surface on the side of the eye. Consequently, it is possible to replace entirely a series of progressive multifocal lenses sold on the market having the progressive refractive surface on the side of the object with a series that have the progressive refractive surface on the side of the eye, and a more comfortable and clearer visual field can be provided for all users.

Furthermore, in the progressive multifocal lens of the present invention, because the progressive refractive surface and the toric surface can be established on the surface on the side of the eye, the surface on the side of the object can be used freely for any purpose. As described above, it becomes possible to provide a fashionable eyeglass lens, in addition to preventing the jumping and warping of images, by making the convex surface on the side of the object a fashionable spherical surface having a constant base curve. Also, it is possible to make the convex surface on the side of the object a rotation axially symmetric non-spherical surface in order to improve the astigmatic aberration of the overall lens.

In Japanese Laid-Open Patent No. 2-289818, the fact is disclosed that by using as the convex surface on the side of the object a non-spherical convex surface with the curvature substantially increased at least in the direction of the perimeter from the axis of symmetry in the vicinity of at least the rotation axially symmetric axis of symmetry, the edge thickness of the lens can be made thinner and the astigmatic aberration can be improved. It is possible to use such a convex surface of a rotation axially symmetric non-spherical surface for the convex surface of the progressive multifocal lens of the present invention.

Furthermore, not limited to a spherical surface or a rotation axially symmetric non-spherical surface, a non-spherical surface for further improving the optical performance, such as the astigmatic aberration of a lens, that is also a fashionable non-spherical surface meeting the user's individuality can be provided on the convex surface on the side of the object. In this manner, according to the present invention, it is possible also to provide a non-spherical surface for the purpose of giving fashion to the optical performance on the convex surface as a progressive multifocal lens. Consequently, by processing the progressive multifocal lens of the present invention into an eyeglass lens, it is possible to provide an eyeglass lens that adds fashionable individuality to the optical performance as a progressive multifocal lens. Furthermore, the possible uses of the surface of the eyeglass lens on the side of the object can be broadened.

The preferred embodiments published in the present specification are only exemplary, and it is obvious that they are not limitations. The scope of the present invention is indicated by the attached claims, and all the modified examples included in the spirit and scope of the present invention are included in the scope of the claims.

The present invention relates to a progressive multifocal lens used as an eyeglass lens. According to the present invention, a progressive multifocal lens can be realized that exhibits little difference in magnification between the distance-vision region and the near-vision region, in while correcting aging vision and correcting astigmatism like conventional progressive multifocal lens, and provide a clearer and more comfortable visual field for the user, by greatly reducing the jumping and warping of images.

We claim:

1. A progressive multifocal lens capable of correcting a user's vision and having a first major surface and a second major surface, where the first major surface is positioned closest to the user's eye when the progressive multifocal lens is worn by the user, the progressive multifocal lens comprising:

a distance-vision region having a first refractive power;

a near-vision region having a second refractive power; and a progressive region joining the distance-vision region and the near-vision region and having a refractive power that varies gradually;

wherein the first major surface is a composite surface that comprises a progressive refractive surface comprising the distance-vision region, near-vision region, and progressive region; and wherein the first major surface includes a surface that corrects astigmatism.

2. The progressive multifocal lens of claim 1, wherein the second major surface of the progressive multifocal lens is spherical.

3. The progressive multifocal lens of claim 1, wherein the second major surface of the progressive multifocal lens is rotationally symmetric and non-spherical.

4. The progressive multifocal lens of claim 1, wherein:

the second major surface of the progressive multifocal lens is rotationally symmetric;

a main line of sight extends from the distance-vision region to the near-vision region; and $$0.5 \leq (D1-D2) \leq 3.5$$

wherein:

D1 is an average surface refractive power of the first major surface in the distance-vision region in a vicinity of the main line of sight; and D2 is an average surface refractive power of the first major surface in the near-vision region in a vicinity of the main line of sight.

5. The progressive multifocal lens of claim 1, wherein a main line of sight extends from the distance-vision region to the near-vision region and a curvature of the progressive refractive surface along the main line of sight decreases in the direction of the near-vision region.

6. The progressive multifocal lens of claim 1, wherein a main line of sight extends from the distance-vision region to the near-vision region and a curvature of the progressive refractive surface in the distance-vision region decreases along at least one direction that progresses away from the main line of sight.

7. The progressive multifocal lens of claim 1, wherein a main line of sight extends from the distance-vision region to the near-vision region and a curvature of the progressive refractive surface in the near-vision region increases along at least one direction that progresses away from the main line of sight.

8. The progressive multifocal lens of claim 1, wherein a main line of sight extends from the distance-vision region to the near-vision region and, at at least one location on the main line of sight, a curvature of the progressive refractive surface along the main line of sight is substantially equal to respective curvatures of the progressive refractive surface along two orthogonal directions.

9. The progressive multifocal lens of claim 1, wherein the first major surface is a toric surface that corrects astigmatism.

10. The progressive multifocal lens of claim 1, wherein the first major surface has cylindrical power.

11. The progressive multifocal lens of claim 1, wherein the first major surface is a composite surface that comprises:
an original progressive refractive surface capable of correcting the user's vision; and
an original toric surface capable of correcting astigmatism.

12. The progressive multifocal lens of claim 11, wherein a value for Z of a corresponding point p(X, Y, Z) on the first major surface is defined as:

$$Z = \frac{(Cp + Cx) X^2 + (Cp + Cy) Y^2}{1 + \sqrt{(1 - (Cp + Cx)^2 X^2 - (Cp + Cy)^2 Y^2)}}$$

where:
X, Y and Z are spatial coordinates along, first, second and third mutually orthogonal directions, respectively;
Cp is an approximate curvature of the original progressive refractive surface;
Cx is a curvature of the original toric surface along the first direction; and
Cy is a curvature of the original toric surface along the second direction.

13. The progressive multifocal lens of claim 1, wherein the progressive multifocal lens exhibits a 270° base prismatic power.

14. The progressive multifocal lens of claim 1, wherein:

$Pb > Ps + Pa$ where:

Ps is a vertex power of the distance-vision region;
Pa is a join power; and
Pb is a refractive power of the second major surface.

15. The progressive multifocal lens of claim 1, wherein the progressive multifocal lens is shaped to fit an eyeglass frame.

16. The progressive multifocal lens of claim 12, wherein the progressive multifocal lens is shaped to fit an eyeglass frame.

17. A method of manufacturing a progressive multifocal lens capable of correcting a user's vision and having a first major surface and a second major surface, where the first major surface is positioned closest to the user's eye when the progressive multifocal lens is worn by the user, the progressive multifocal lens having a distance-vision region having a first refractive power, a near-vision region having a second refractive power, and a progressive region joining the distance-vision region and the near-vision region and having a refractive power that varies, the method comprising:
determining parameters of an original progressive refractive surface capable of correcting the user's vision;
determining parameters of an original toric surface capable of correcting astigmatism; and
determining parameters of the first major surface of the progressive multifocal lens from the parameters of the original progressive refractive surface and the parameters of the original toric surface.

18. The method of claim 17, wherein a value for Z of a corresponding point p(X, Y, Z) on the first major surface is determined using the relation:

$$Z = \frac{(Cp + Cx) X^2 + (Cp + Cy) Y^2}{1 + \sqrt{(1 - (Cp + Cx)^2 X^2 - (Cp + Cy)^2 Y^2)}}$$

where:
X, Y and Z are spatial coordinates along, first, second and third mutually orthogonal directions, respectively;
Cp is an approximate curvature of the original progressive refractive surface;
Cx is a curvature of the original toric surface along the first direction; and
Cy is a curvature of the original toric surface along the second direction.

19. The method of claim 17, wherein the parameters determined for the first major surface define a spherical surface.

20. The method of claim 17, further comprising determining parameters of the second major surface, the parameters defining a rotationally symmetric non-spherical surface.

* * * * *

(12) EX PARTE REEXAMINATION CERTIFICATE (10072nd)
United States Patent
Mukaiyama et al.

(10) Number: US 6,019,470 C1
(45) Certificate Issued: Mar. 13, 2014

(54) PROGRESSIVE MULTIFOCAL LENS AND MANUFACTURING METHOD OF EYEGLASS LENS AND PROGRESSIVE MULTIFOCAL LENS

(75) Inventors: Hiroyuki Mukaiyama, Suwa (JP); Kazutoshi Kato, Suwa (JP)

(73) Assignee: Seiko Epson Corporation, Shinjuku-Ku, Tokyo (JP)

Reexamination Request:
No. 90/012,872, May 21, 2013

Reexamination Certificate for:
Patent No.: 6,019,470
Issued: Feb. 1, 2000
Appl. No.: 08/849,386
Filed: Jun. 3, 1997

(21) Appl. No.: 90/012,872

(22) PCT Filed: Oct. 11, 1996

(86) PCT No.: PCT/JP96/02973
§ 371 (c)(1),
(2), (4) Date: Jun. 3, 1997

(87) PCT Pub. No.: WO97/19382
PCT Pub. Date: May 29, 1997

(30) Foreign Application Priority Data

Nov. 24, 1995 (JP) .................................. 7-306189

(51) Int. Cl.
*G02C 7/06* (2006.01)
*G02C 7/02* (2006.01)

(52) U.S. Cl.
USPC ............. 351/159.42; 351/159.73; 351/159.75

(58) Field of Classification Search
None
See application file for complete search history.

(56) References Cited

To view the complete listing of prior art documents cited during the proceeding for Reexamination Control Number 90/012,872, please refer to the USPTO's public Patent Application Information Retrieval (PAIR) system under the Display References tab.

*Primary Examiner* — Linh M. Nguyen

(57) ABSTRACT

A progressive multifocal lens used for correction of vision includes a progressive refractive surface positioned closest to the user's eye when the lens is worn by the user, and a second surface on an object side of the lens. Because the base curve of the second surface can be a constant spherical surface, it is possible to prevent variations in magnification due to shape factors. In addition, differences in magnification between a distance-vision region and a near-vision region of the progressive multifocal lens are reduced, and variations in the magnification of a progressive refractive region in the progressive multifocal lens can be suppressed. Accordingly, image jumping and warping due to differences in magnification are reduced, resulting in a comfortable visual field for the user. A progressive multifocal lens for correction of astigmatism includes a progressive refractive surface and a toric surface that are combined to form a composite surface positioned closest to the user's eye when the lens is worn by the user.

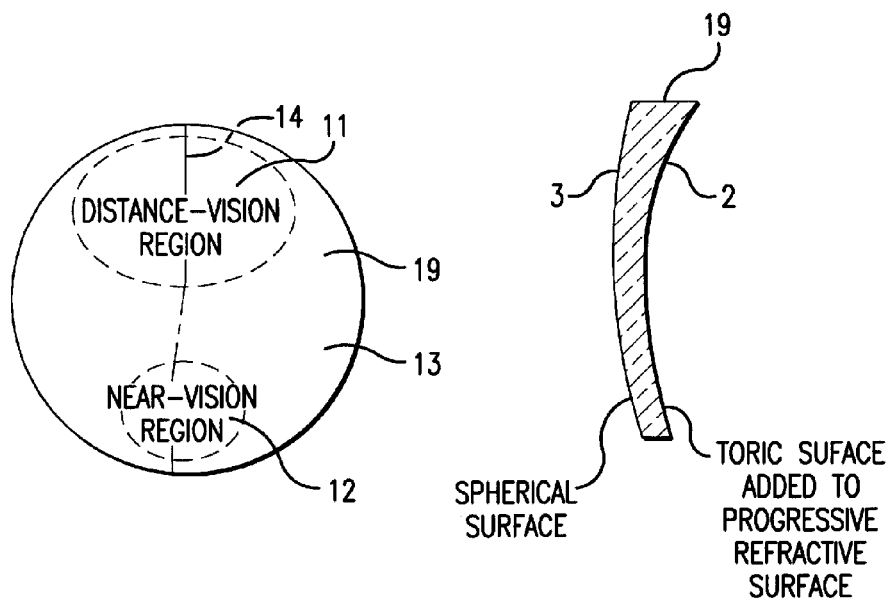

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-20 is confirmed.

New claims 21-26 are added and determined to be patentable.

21. *The progressive multifocal lens of claim 1, wherein a value for Z of a corresponding point p(X, Y, Z) on the first major surface is defined using a composite equation, the composite equation including a term representing the approximate curvature of the original progressive refractive surface, the approximate curvature being the average curvature of a radial direction of the lens, where X, Y and Z are spatial coordinates along, first, second and third mutually orthogonal directions, respectively.*

22. *The method of claim 17, wherein a value for Z of a corresponding point p(X, Y, Z) on the first major surface is determined defined using a composite equation, the composite equation including a term representing the approximate curvature of the original progressive refractive surface, the approximate curvature being the average curvature of a radial direction of the lens, where X, Y and Z are spatial coordinates along, first, second and third mutually orthogonal directions, respectively.*

23. *The progressive multifocal lens of claim 12, wherein the approximate curvature of the original progressive refractive surface, Cp, is the average curvature of a radial direction of the lens.*

24. *The method of claim 18, wherein the approximate curvature of the original progressive refractive surface, Cp, is the average curvature of a radial direction of the lens.*

25. *The progressive multifocal lens of claim 12, wherein, as the approximate curvature Cp, reciprocals of a circular radius passing through three points in the xy plane perpendicular to the z-axis passing through a center of the lens or an internal vertex are used:*

*any point p(X, Y, Z) on the original progressive refractive surface;*

*a point p'(-X, -Y, Z) rotationally symmetric with point p; and*

*the internal vertex (0, 0, 0).*

26. *The method of claim 28, wherein, as the approximate curvature Cp, reciprocals of a circular radius passing through three points in the xy plane perpendicular to the z-axis passing through a center of the lens or an internal vertex are used:*

*any point p(X, Y, Z) on the original progressive refractive surface;*

*a point p'(-X, -Y, Z) rotationally symmetric with point p; and*

*the internal vertex (0, 0, 0).*

\* \* \* \* \*